(12) United States Patent
Hill

(10) Patent No.: US 7,312,877 B2
(45) Date of Patent: Dec. 25, 2007

(54) METHOD AND APPARATUS FOR ENHANCED RESOLUTION OF HIGH SPATIAL FREQUENCY COMPONENTS OF IMAGES USING STANDING WAVE BEAMS IN NON-INTERFEROMETRIC AND INTERFEROMETRIC MICROSCOPY

(75) Inventor: Henry Allen Hill, Tucson, AZ (US)

(73) Assignee: Zetetic Institute, Tucson, AZ (US)

( * ) Notice: Subject to any disclaimer, the term of this patent is extended or adjusted under 35 U.S.C. 154(b) by 168 days.

(21) Appl. No.: 10/954,625

(22) Filed: Sep. 30, 2004

(65) Prior Publication Data

US 2005/0206909 A1    Sep. 22, 2005

Related U.S. Application Data

(60) Provisional application No. 60/507,675, filed on Oct. 1, 2003.

(51) Int. Cl.
*G01B 9/02* (2006.01)
(52) U.S. Cl. ...................................................... 356/496
(58) Field of Classification Search ................ 356/496, 356/503, 504, 491, 493
See application file for complete search history.

(56) References Cited

U.S. PATENT DOCUMENTS

| | | | |
|---|---|---|---|
| 3,628,027 A | 12/1971 | Brauss | |
| 3,748,015 A | 7/1973 | Offner | |
| 4,011,011 A | 3/1977 | Hemstreet et al. | |
| 4,226,501 A | 10/1980 | Shafer | |
| 4,272,684 A | 6/1981 | Seachman | |
| 4,685,803 A | 8/1987 | Sommargren | |
| 4,733,967 A | 3/1988 | Sommargren | |
| 5,220,403 A | 6/1993 | Batchelder | |
| 5,241,423 A | 8/1993 | Chiu et al. | |
| 5,327,223 A | 7/1994 | Korth | |
| 5,485,317 A | 1/1996 | Perissinotto et al. | |
| 5,508,801 A * | 4/1996 | Panin et al. | 356/35.5 |
| 5,602,643 A | 2/1997 | Barrett | |
| 5,614,763 A | 3/1997 | Womack | |
| 5,633,972 A | 5/1997 | Walt et al. | |
| 5,659,420 A | 8/1997 | Wakai | |
| 5,666,197 A * | 9/1997 | Guerra | 356/512 |
| 5,699,201 A | 12/1997 | Lee | |
| 5,757,493 A | 5/1998 | Vankerkhove | |
| 5,760,901 A | 6/1998 | Hill | |
| 5,828,455 A | 10/1998 | Smith | |
| 5,894,195 A | 4/1999 | McDermott | |

(Continued)

OTHER PUBLICATIONS

U.S. Appl. No. 09/852,369, filed Jan. 03, 2002, Hill.

(Continued)

*Primary Examiner*—Hwa (Andrew) Lee
(74) *Attorney, Agent, or Firm*—Wilmer Cutler Pickering Hale & Dorr LLP

(57) ABSTRACT

A method of measuring properties of a substrate, the method involving: illuminating a spot on the substrate with a standing wave measurement beam to generate a return measurement beam, the standing wave measurement beam characterized by a standing wave pattern; generating an electrical signal from the return measurement beam; causing the standing wave pattern to be at a succession of different positions on the surface of the substrate; and for each of the succession of different positions of the standing wave pattern, acquiring measurement data from the electrical signal.

42 Claims, 15 Drawing Sheets

U.S. PATENT DOCUMENTS

| | | | |
|---|---|---|---|
| 5,915,048 A | 6/1999 | Hill et al. |
| 6,011,654 A | 1/2000 | Schweizer et al. |
| 6,052,231 A | 4/2000 | Rosenbluth |
| 6,091,496 A | 7/2000 | Hill |
| 6,124,931 A | 9/2000 | Hill |
| 6,271,923 B1 | 8/2001 | Hill |
| 6,330,065 B1 | 12/2001 | Hill |
| 6,445,453 B1 | 9/2002 | Hill |
| 6,447,122 B1 | 9/2002 | Kobayashi et al. |
| 6,480,285 B1 | 11/2002 | Hill |
| 6,552,805 B2 | 4/2003 | Hill |
| 6,552,852 B2 | 4/2003 | Hill |
| 6,597,721 B1 | 7/2003 | Hutchinson et al. |
| 6,606,159 B1 | 8/2003 | Hill |
| 6,667,809 B2 | 12/2003 | Hill |
| 6,714,349 B2 | 3/2004 | Nam |
| 6,717,736 B1 | 4/2004 | Hill |
| 6,753,968 B2 | 6/2004 | Hill |
| 6,775,009 B2 | 8/2004 | Hill |
| 6,847,029 B2 | 1/2005 | Hill |
| 6,847,452 B2 | 1/2005 | Hill |
| 2002/0074493 A1 | 6/2002 | Hill |
| 2002/0131179 A1 | 9/2002 | Hill |
| 2003/0174992 A1 | 9/2003 | Levene |
| 2004/0201852 A1 | 10/2004 | Hill |
| 2004/0201853 A1 | 10/2004 | Hill |
| 2004/0201854 A1 | 10/2004 | Hill |
| 2004/0201855 A1 | 10/2004 | Hill |
| 2004/0202426 A1 | 10/2004 | Hill |
| 2004/0227950 A1 | 11/2004 | Hill |
| 2004/0227951 A1 | 11/2004 | Hill |
| 2004/0228008 A1 | 11/2004 | Hill |
| 2004/0246486 A1 | 12/2004 | Hill |
| 2004/0257577 A1 | 12/2004 | Hill |
| 2005/0036149 A1 | 2/2005 | Hill |

OTHER PUBLICATIONS

U.S. Appl. No. 09/917,402, filed Jul. 27, 2001, Hill.
U.S. Appl. No. 10/765,254, filed Jan. 27, 2004, Hill.
U.S. Appl. No. 10/765,368, filed Jan. 27, 2004, Hill.
U.S. Appl. No. 10/886,157, filed Jul. 07, 2004, Hill.
U.S. Appl. No. 60/442,858, filed Jul. 27, 2002, Hill.
U.S. Appl. No. 60/442,982, filed Jan. 29, 2003, Hill.
U.S. Appl. No. 60/443,980, filed Jan. 31, 2003, Hill.
U.S. Appl. No. 60/444,707, filed Jan. 4, 2003, Hill.
U.S. Appl. No. 60/445,739, filed Feb. 7, 2003, Hill.
U.S. Appl. No. 60/447,254, filed Feb. 13, 2003, Hill.
U.S. Appl. No. 60/448,250, filed Jan. 19, 2003, Hill.
U.S. Appl. No. 60/448,360, filed Feb. 19, 2003, Hill.
U.S. Appl. No. 60/459,425, filed Apr. 11, 2003, Hill.
U.S. Appl. No. 60/459,493, filed Apr. 1, 2003, Hill.
U.S. Appl. No. 60/460,129, filed Apr. 3, 2003, Hill.
U.S. Appl. No. 60/485,255, filed Jul. 7, 2003, Hill.
U.S. Appl. No. 60/485,507, filed Jul. 7, 2003, Hill.
U.S. Appl. No. 60/501,666, filed Sep. 10, 2003, Hill.
U.S. Appl. No. 60/506,715, filed Sep. 26, 2003, Hill.

* cited by examiner

METHOD AND APPARATUS FOR ENHANCED RESOLUTION OF HIGH SPATIAL FREQUENCY COMPONENTS OF IMAGES USING STANDING WAVE BEAMS IN NON-INTERFEROMETRIC AND INTERFEROMETRIC MICROSCOPY

This application claims the benefit of U.S. Provisional Application No. 60/507,675, filed Oct. 1, 2003.

BACKGROUND OF THE INVENTION

A number of different applications of catadioptric imaging systems for far-field and near-field interferometric confocal and non-confocal microscopy have been described such as in commonly owned U.S. Pat. No. 6,552,852 (ZI-38) entitled "Catoptric And Catadioptric Imaging Systems" and U.S. Pat. No. 6,717,736 (ZI-43) entitled "Catoptric And Catadioptric Imaging Systems;" U.S. Provisional Patent Applications No. 60/447,254, filed Feb. 13, 2003, entitled "Transverse Differential Interferometric Confocal Microscopy," (ZI-40); No. 60/448,360, filed Feb. 19, 2003, entitled "Longitudinal Differential Interferometric Confocal Microscopy for Surface Profiling," (ZI-41); No. 60/448,250, filed Feb. 19, 2003, entitled "Method and Apparatus for Dark Field Interferometric Confocal Microscopy," (ZI-42); No. 60/442,982, filed Jan. 28, 2003, entitled "Interferometric Confocal Microscopy Incorporating Pinhole Array Beam-Splitter," (ZI-45); No. 60/459,425, filed Apr. 1, 2003, entitled "Apparatus and Method for Joint Measurement Of Fields Of Scattered/Reflected Orthogonally Polarized Beams By An Object In Interferometry," (ZI-50); No. 60/485,507, filed Jul. 7, 2003, entitled "Apparatus And Method For High Speed Scan For Sub-Wavelength Defects And Artifacts In Semiconductor Metrology," (ZI-52); No. 60/485,255, filed Jul. 7, 2003, entitled "Apparatus and Method for Ellipsometric Measurements with High Spatial Resolution," (ZI-53); No. 60/501,666, filed Sep. 10, 2003, entitled "Catoptric And Catadioptric Imaging Systems With Adaptive Catoptric Surfaces," (ZI-54); No. 60/602,046, filed Aug. 16, 2004, entitled "Apparatus And Method For Joint And Time Delayed Measurements Of Components Of Conjugated Quadratures Of Fields Of Reflected/Scattered Beams By An Object In Interferometry," (ZI-57); No. 60/506,715, filed Sep. 26, 2003, entitled "Catoptric and Catadioptric Imaging Systems Comprising Pellicle Beam-Splitters and Non-Adaptive and Adaptive Catoptric Surfaces," (ZI-56); and No. 60/611,564, filed Sep. 20, 2004, entitled "Catoptric Imaging Systems Comprising Pellicle Beam-Splitters and Non-Adaptive and/or Adaptive Catoptric Surfaces," (ZI-58); and U.S. patent application Ser. No. 10/778,371, filed Feb. 13, 2004, entitled "Transverse Differential Interferometric Confocal Microscopy," (ZI-40); Ser. No. 10/782,057, filed Feb. 19, 2004, entitled "Longitudinal Differential Interferometric Confocal Microscopy for Surface Profiling," (ZI-41); Ser. No. 10/782,058, filed Feb. 19, 2004, entitled "Method and Apparatus for Dark Field Interferometric Confocal Microscopy," (ZI-42); Ser. No. 10/765,229, filed Jan. 27, 2004, entitled "Interferometric Confocal Microscopy Incorporating Pinhole Array Beam-Splitter," (ZI-45); Ser. No. 10/816,180, filed Apr. 1, 2004, entitled "Apparatus and Method for Joint Measurement Of Fields Of Scattered/Reflected or Transmitted Orthogonally Polarized Beams By An Object In Interferometry," (ZI-50); Ser. No. 10/886,010, filed Jul. 7, 2004, entitled "Apparatus And Method For High Speed Scan For Sub-Wavelength Defects And Artifacts In Semiconductor Metrology," (ZI-52); Ser. No. 10/886,157, filed Jul. 7, 2004, entitled "Apparatus and Method for Ellipsometric Measurements with High Spatial Resolution," (ZI-53); No. 10/938,408, filed Sep. 10, 2004, entitled "Catoptric And Catadioptric Imaging Systems With Adaptive Catoptric Surfaces," (ZI-54); No. 10/948,959, filed Sep. 24, 2004, entitled "Catoptric and Catadioptric Imaging Systems with Pellicle and Aperture-Array Beam-Splitters and Non-Adaptive and Adaptive Catoptric Surfaces". In addition, U.S. patent application (ZI-48) Ser. No. 10/218,201, entitled "Method for Constructing a Catadioptric Lens System," filed Apr. 1, 2004 described one way to make some of these catadioptric lens systems. These patents, patent applications, and provisional patent applications are all by Henry A. Hill and the contents of each are incorporated herein in their entirety by reference.

SUMMARY OF THE INVENTION

Methods and apparatuses are described for achieving enhanced resolution of high spatial frequency components of images generated in non-interferometric microscopy using standing wave illumination of a substrate and in interferometric microscopy using a standing wave reference beam and/or standing wave measurement beam and wherein a measurement object may also be used simultaneously as a reference object. The enhanced resolution is achieved in microscopy systems operating in either a reflection or a transmission mode. The resolution for the high spatial frequency components is enhanced by approximately a factor of 2 in one dimension or two orthogonal dimensions with respect to that achievable in other imaging systems.

Taught herein is how to improve lateral spatial resolution for high spatial frequency components in interferometric microscopy by using a standing wave beam as a measurement beam incident on a measurement object and a reference beam that may or may not comprise a standing wave beam wherein the measurement object may also serve simultaneously as the reference object. Also taught herein is how to use standing wave beams in interference microscopy to obtain the improvement in lateral spatial resolution concurrently with a depth discrimination that is similar to or better than the depth discrimination obtained in a confocal microscopy system.

Taught herein, in addition in interferometric microscopy, the use of an object that is being imaged as the element that combines the measurement beam and reference beam subsequently detected to generate an electrical interference signal.

The standing wave measurement beam is generated by superimposing two beams at a spot on an object that have the same nominal angle of incidence on the object, coplanar planes of incidence, and the angle between the incident beams is equal to the sum of the respective angles of incidence. The state of polarization of each of the two beams may be either a s or p polarization. A standing wave reference beam when used is generated in a like manner by superimposing two beams that have the same nominal angle of incidence at a spot on a beam combining element, coplanar planes of incidence, and the angle between the incident beams is equal to the sum of the respective angles of incidence.

Also taught herein is in non-interferometric microscopy the practice of using a standing wave beam for illumination of an object that is being imaged.

The net result of using a standing wave or standing wave beams in either non-interferometric or interferometric microscopy is an improvement in lateral spatial resolution for high spatial frequency components by a factor of approximately 2.

In general, in one aspect, the invention features a method of measuring properties of a substrate. The method involves: illuminating a spot on the substrate with a standing wave measurement beam to generate a return measurement beam; generating an electrical signal from the return measurement beam; causing the standing wave pattern to be at a succession of different positions on the surface of the substrate; and for each of the succession of different positions of the standing wave pattern, acquiring measurement data from the electrical signal.

Other embodiments include one or more of the following features. The measurement beam is characterized by a wavelength, $\lambda$, and each position of among the succession of different locations after a first location is separated from the preceding position by a distance of less than one wavelength, $\lambda$. The method also includes: illuminating an object with a standing wave reference beam to generate a return reference beam; and interfering the return measurement beam and the return reference beam to generate an interference beam, wherein generating the electrical signal involves generating the electrical signal from the interference beam. Illuminating the object with a standing wave reference beam involves interfering two reference beams at the object to generate the standing wave reference beam. Illuminating the spot with a standing wave measurement beam involves interfering two measurement beams at the spot on the substrate to produce the standing wave measurement beam. The object is the substrate. The substrate has a front side and a back side and illuminating the spot on the substrate with the standing wave measurement beam involves directing a first measurement beam and a second measurement beam at the spot from the backside of the substrate to produce the standing wave measurement beam, the first and second measurement beams traveling in opposite directions relative to the surface of the substrate and wherein the return measurement beams emanates from the front side of the substrate. The two measurements beams lie in a first plane and the two reference beams lie in a second plane, and the method further also involves orienting the first and second planes to be orthogonal to each other. The method further includes: generating an input beam; and deriving the first and second measurement beams and the first and second reference beams from the input beam. Acquiring measurement data from the electrical signal involves measuring components of conjugated quadratures of fields of scattered/ reflected beams by the substrate. Causing the standing wave pattern to be at the succession of different positions on the surface of the substrate involves moving the substrate. Alternatively, it involves scanning the standing wave pattern over the substrate. Generating the electrical signal from the interference beam involves directing the interference beam onto a detector. Generating the electrical signal from the interference beam involves directing the interference beam onto a fluorescent material to generate an optical signal and directing the optical signal onto a detector to generate the electrical signal.

In general, in another aspect, the invention features a method of interferometrically measuring properties of an object. The method involves: illuminating a spot on the object with a standing wave measurement beam to generate a return measurement beam; interfering the return measurement beam with a reference beam to generate an interference beam; generating an electrical interference signal from the interference beam; and acquiring measurement data from the electrical interference signal.

Other embodiments include one or more of the following features. The method also involves causing the standing wave pattern to be at a succession of different positions on the surface of the substrate, and acquiring measurement data involves for each of the succession of different positions of the standing wave pattern, acquiring measurement data from the electrical interference signal. The measurement beam is characterized by a wavelength, $\lambda$, and each position of among the succession of different locations after a first location is separated from the preceding position by a distance of less than one wavelength, $\lambda$. The method further includes: illuminating an object with a standing wave reference beam to generate a return reference beam; and interfering the return measurement beam and the return reference beam to generate the interference beam. Illuminating the object with a standing wave reference beam involves interfering two reference beams at the object to generate the standing wave reference beam. Illuminating the spot with a standing wave measurement beam involves interfering two measurement beams at the spot on substrate to produce the standing wave measurement beam. The object is the substrate. The substrate has a front side and a back side and illuminating the spot on the substrate with the standing wave measurement beam involves directing a first measurement beam and a second measurement beam at the spot from the backside of the substrate to produce the standing wave measurement beam, the first and second measurement beams traveling in opposite directions relative to the surface of the substrate and the return measurement beams emanating from the front side of the substrate. The two measurements beams lie in a first plane and the two reference beams lie in a second plane, and the method further involves orienting the first and second planes to be orthogonal to each other. The method also involves: generating an input beam; and deriving the first and second measurement beams and the first and second reference beams from the input beam. Causing the standing wave pattern to be at the succession of different positions on the surface of the substrate involves moving the substrate. Alternatively, causing the standing wave pattern to be at the succession of different positions on the surface of the substrate involves scanning the standing wave pattern over the substrate. Generating the electrical interference signal from the interference beam involves directing the interference beam onto a detector. Alternatively, generating the electrical signal from the interference beam involves directing the interference beam onto a fluorescent material to generate a optical signal and directing the optical signal onto a detector to generate the electrical interference signal.

In general, in still another aspect, the invention features an interferometric system for measuring properties of a substrate. The system includes: an optical system for illuminating a spot on the substrate with a standing wave measurement beam to thereby produce a return measurement beam from that spot; an interferometer for interfering the return measurement beam with a reference beam to generate an interference beam; and a detector system for converting the interference beam to an electrical interference signal.

Other embodiments include one or more of the following features. The optical system includes a beam splitter for separating a first input beam into a first measurement beam and a second measurement beam and further optics for directing the first measurement beam onto the spot from one direction and the second measurement beam onto the spot from an opposite direction so as to produce the standing wave measurement beam. The further optics of the optical system is arranged to operate in a reflection mode by directing the first measurement beam and a second measurement beam at the spot from the front side of the substrate to produce the standing wave measurement beam and the return measurement beam emanates away from the front side of the substrate. Alternatively, the further optics of the optical system is arranged to operate in a transmission mode by directing the first measurement beam and a second measurement beam at the spot from the backside of the substrate to produce the standing wave measurement beam and the return measurement beam emanates away from the front side of the substrate. The interferometer includes a second optical system for illuminating an object with a standing wave reference beam to produce the return reference beam. The object is the substrate. The second optical system includes a beam splitter for separating a second input beam into a first reference beam and a second reference beam and further optics for directing the first reference beam onto the spot from one direction and the second reference beam onto the spot from an opposite direction so as to produce the standing wave reference beam. The interferometric system further includes a beam source for generating a source beam, wherein the first and second input beams are derived from the source beam. The beam source includes a beam splitter for splitting the source beam into the first and second input beams. The interferometric system further includes a transport mechanism for holding the object and scanning the object relative to the interferometer. The interferometer includes a catadioptric imaging system. The detector system includes a detector and an imaging system which focuses the interference beam onto the detector. Alternatively, the detector system includes a fluorescent material onto which the interference beam impinges to produce an optical signal, a detector, and an imaging system which directs the optical signal onto the detector. The optical signal is at a different wavelength from the interference signal.

An advantage of at least one embodiment of the present invention is the generation of an enhanced lateral resolution for high spatial frequency components of an image in one axis of a coordinate system.

Another advantage of at least one embodiment of the present invention is the generation of an enhanced lateral resolution for high spatial frequency components of an image in two orthogonal axes of a coordinate system.

Another advantage of at least one embodiment of the present invention is the availability of a large working distance.

Another advantage of at least one embodiment of the present invention is a depth discrimination against out-of-focus images similar to or better than that associated with confocal microscopy.

Another advantage of at least one embodiment of the present invention is the generation of a depth discrimination with respect to out-of-focus images concomitant with an enhancement in lateral spatial resolution for high spatial frequency components of an image.

Another advantage of at least one embodiment of the present invention is an enhanced lateral resolution with respect to high spatial frequency components of an image for non-interferometric microscopy applications.

Another advantage of at least one embodiment of the present invention is an enhanced lateral resolution with respect to high spatial frequency components of an image for interferometric microscopy applications.

Another advantage of at least one embodiment of the present invention is the operation in a dark field mode for measurement of reflection properties of a substrate.

Another advantage of at least one embodiment of the present invention is that enhanced lateral resolution for high spatial frequency components of an image may be achieved in both the reflection and transmission modes of operation.

Another advantage of at least one embodiment of the present invention is that the enhanced lateral resolution for high spatial frequency components of an image is independent of depth of an imaged plane section embedded in a substrate.

Another advantage of at least one embodiment of the present invention is that a substrate being imaged may also serve as reference and measurement beam objects simultaneously in interferometric microscopy measurements of the substrate.

BRIEF DESCRIPTION OF THE DRAWINGS

FIG. 1l is a graph of properties an electrical interference signal that is generated using standing wave reference and measurement beams at reference and measurement objects, respectively, wherein the reference and measurement objects are the same object.

DETAILED DESCRIPTION

A general description of interferometric microscopy embodiments of the present invention will first be given. The interferometric microscopy embodiments are separated into groups according to properties of a measurement beam incident on an object or substrate; to whether the substrate is used as both the measurement and reference beam objects simultaneously or only as a measurement beam object; and to properties of a reference beam incident on a beam combining element, e.g., a beam-splitter.

The referenced properties of the measurement beam are with respect to a state of polarization of a standing wave beam, spatial properties of the standing wave beam, and the spatial properties relative to the state of polarization. For a reference beam comprising a standing wave beam at a beam combining element and/or at a reference object, the referenced properties of the reference beam are with respect to a state of polarization of a standing wave beam, spatial properties of the standing wave beam, and the spatial properties relative to the state of polarization or the state of polarization relative to the direction of propagation of the reference beam. For a reference beam comprising a non-standing wave beam at a beam combining element and/or reference object, the referenced properties of the reference beam are with respect to a state of polarization of the reference beam relative to the plane of incidence at a beam combining element or the state of polarization relative to a coordinate system at the beam combining element. The embodiments for use in non-interferometric microscopy are separated into groups according to the state of polarization and spatial properties of the beam illuminating the substrate.

In the following description of the different embodiments, many elements of the different embodiments perform like functions and are indicated with the same numerals in different respective figures of the embodiments.

Figure 1A:
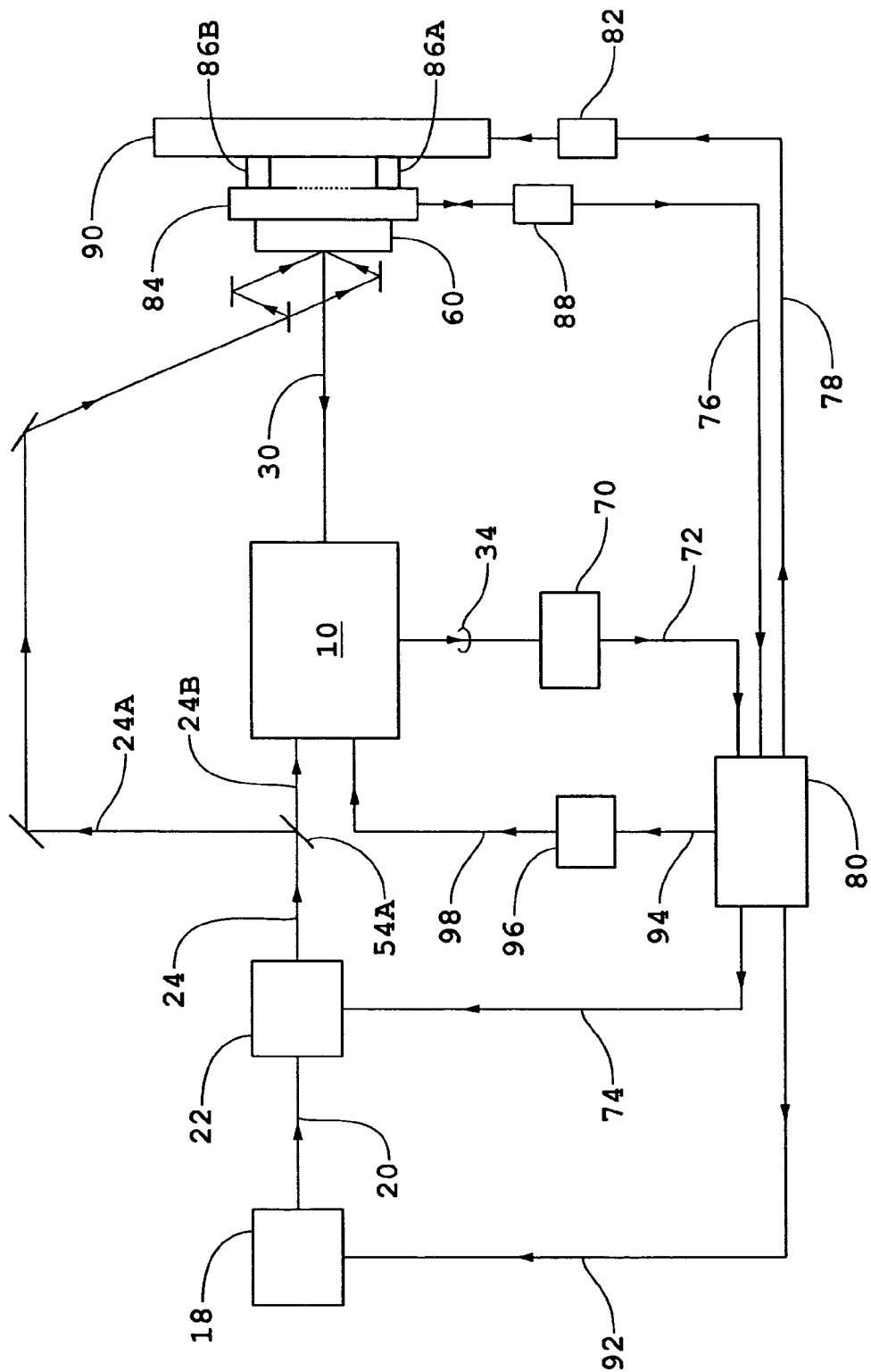
FIG. 1a is a schematic diagram of an interferometric system operating in a reflection mode configured with a standing wave measurement beam at a measurement object.

Referring to FIG. 1a, an interferometer system is shown diagrammatically as an interferometer system operating in a reflection mode to measure components of conjugated quadratures of fields reflected/scattered by substrate 60 with a measurement beam comprising a standing wave beam at substrate 60. The components of the conjugated quadratures may be measured jointly. The interferometer system shown diagrammatically in FIG. 1a comprises an interferometer 10, a source 18, a beam-conditioner 22, a detector 70, an electronic processor and controller 80, and a measurement object shown as substrate 60. Source 18 generates input beam 20.

Reference and measurement beams are generated in beam-conditioner 22 and the measurement beam generated in beam-conditioner 22 is incident on substrate 60 as a standing wave beam. Beam 30 comprises a return reflected/scattered measurement beam that is generated by the reflection/scattering of the measurement beam by substrate 60. The return reflected/scattered measurement beam 30 is combined with the reference beam by a beam combiner (not shown) in interferometer 10 to form a mixed beam. In certain embodiments, the mixed beam is incident on a thin fluorescent layer and output beam 32 comprises an optical interference beam generated by fluorescence. In certain other embodiments, output beam 32 comprises the mixed optical beam.

Output beam 32 is detected by detector 70 to generate an electrical interference signal 72 from either the optical interference beam generated by fluorescence from the mixed output beam in the certain embodiments or from the mixed optical beam in the certain other embodiments. The composition of the thin fluorescent layer is selected such that the decay time of the fluorescence is much shorter than the read out time of detector 70.

Detector 70 may comprise in the certain other embodiments an analyzer to select common polarization states of the reference and return measurement beam components of beam 32 to form a mixed beam in lieu of beam 32 being formed as a mixed beam.

Substrate 60 is translated by stage 90 wherein substrate 60 is mounted on wafer chuck 84 with wafer chuck 84 mounted on stage 90. The position of stage 90 is controlled by transducer 82 according to servo control signal 78 from electronic processor and controller 80. The position of stage 90 is measured by metrology system 88 and position information acquired by metrology system 88 is transmitted as signal 76 to electronic processor and controller 80 to generate an error signal for use in the position control of stage 90. Metrology system 88 may comprise for example linear displacement and angular displacement interferometers and cap gauges. The elevation and angular orientation of substrate 60 is controlled by transducers 86A and 86B according to servo control signal 78.

In the practice wherein heterodyne and bi- or quad-homodyne detection methods are used, known phase shifts are introduced between the reference and measurement beam components of mixed beam 32 generated by interferometer system 10. For heterodyne detection methods, the phase shifts are introduced as a consequence of the reference and measurement beams having different frequencies. With respect to the bi- or quad-homodyne detection methods, the phase shifts are introduced by either of two techniques. In one technique, phase shifts are introduced between the reference and measurement beam components for each of the frequency components by beam-conditioner 22 as controlled by signal 74 from electronic processor and controller 80. In the second technique, phase shifts are introduced between the reference and measurement beam components of mixed beam 32 for each of the frequency components as a consequence of frequency shifts introduced to the frequency components of input beam 24 by beam-conditioner 22 as controlled by signal 74 from electronic processor and controller 80.

In the practice wherein N-dimensional bi- and quad-homodyne detection methods are used in certain embodiments, additional phase shifts are introduced between each corresponding reference and measurement beam portion of N portions of the mixed beam generated by interferometer 10. The additional phase shifts are in addition to those introduced in the implementation of bi- or quad-homodyne detection methods. The additional phase shifts are generated in interferometer 10 by causing for example changes in the locations of elements of adaptive catoptric surfaces.

The description of source 18 including a pulse mode of operation and beam-conditioner 22 is the same as the corresponding portions of the description given to the source and beam-conditioner in embodiments described in commonly owned U.S. Provisional Patent Application No. 60/442,858 (ZI-47) entitled "Apparatus and Method for Joint Measurements of Conjugated Quadratures of Fields of Reflected/Scattered Beams by an Object in Interferometry" and U.S. patent application Ser. No. 10/765,368 (ZI-47) entitled "Apparatus and Method for Joint Measurements of Conjugated Quadratures of Fields of Reflected/Scattered or Transmitted Beams by an Object in Interferometry" wherein the provisional and the non-provisional patent applications are by Henry A. Hill and the contents of which are herein incorporated in their entirety by reference and in cited U.S. Provisional Patent Application No. 60/485,255 (ZI-53), in cited U.S. Provisional Patent Ser. No. 60/602,046 filed Aug. 16, 2004 (ZI-57) entitled "Apparatus and Method for Joint And Time Delayed Measurements of Components of Conjugated Quadratures of Fields of Reflected/Scattered and Transmitted/Scattered Beams by an Object in Interferometry," and in cited U.S. patent application Ser. No. 60/485, 255 filed Jul. 7, 2003 (ZI-53) entitled "Apparatus and Method for Ellipsometric Measurements with High Spatial Resolution."

The descriptions the of bi-homodyne and quad-homodyne detection methods used in certain of the embodiments of the present invention are the same as corresponding portions of the descriptions given for the descriptions of bi-homodyne and quad-homodyne detection methods in the cited U.S. Provisional Patent Application Nos. 60/442,858 (ZI-47) and 60/485,255 (ZI-53) and in cited U.S. patent application Ser. No. 10/765,368 (ZI-47) and U.S. patent application Ser. No. 60/485,255 filed Jul. 7, 2003 (ZI-53) wherein the homodyne detection methods are based on frequency encoding. The extension of the bi- and quad-homodyne detection methods to N-dimensional bi- and quad-homodyne detection methods based on a combination of frequency encoding and either amplitude or phase modulations or permutations is implemented in the embodiments by the use for example of conjugate pairs of adaptive reflective surfaces of subsequently described catadioptric imaging system 410A (see FIGS. 2a and 2b) as optical switches or as $\pi$ phase shifters, respectively.

The extension of the bi- and quad-homodyne detection methods to N-dimensional bi- and quad-homodyne detection methods may also be based on a combination of frequency encoding, polarization encoding, and either amplitude or phase modulations or permutations. The description of bi- and quad-homodyne detection methods based on a combination of frequency and polarization encoding is the same as the corresponding description given in cited U.S. Provisional Patent Application No. 60/459,425 (ZI-50) and in cited U.S. patent application Ser. No. 60/459, 425 filed Apr. 1, 2003 (ZI-50) entitled "Apparatus and Method for Joint Measurement Of Fields Of Orthogonally Polarized Beams Scattered/Reflected By An Object In Interferometry."

Figure 2A:
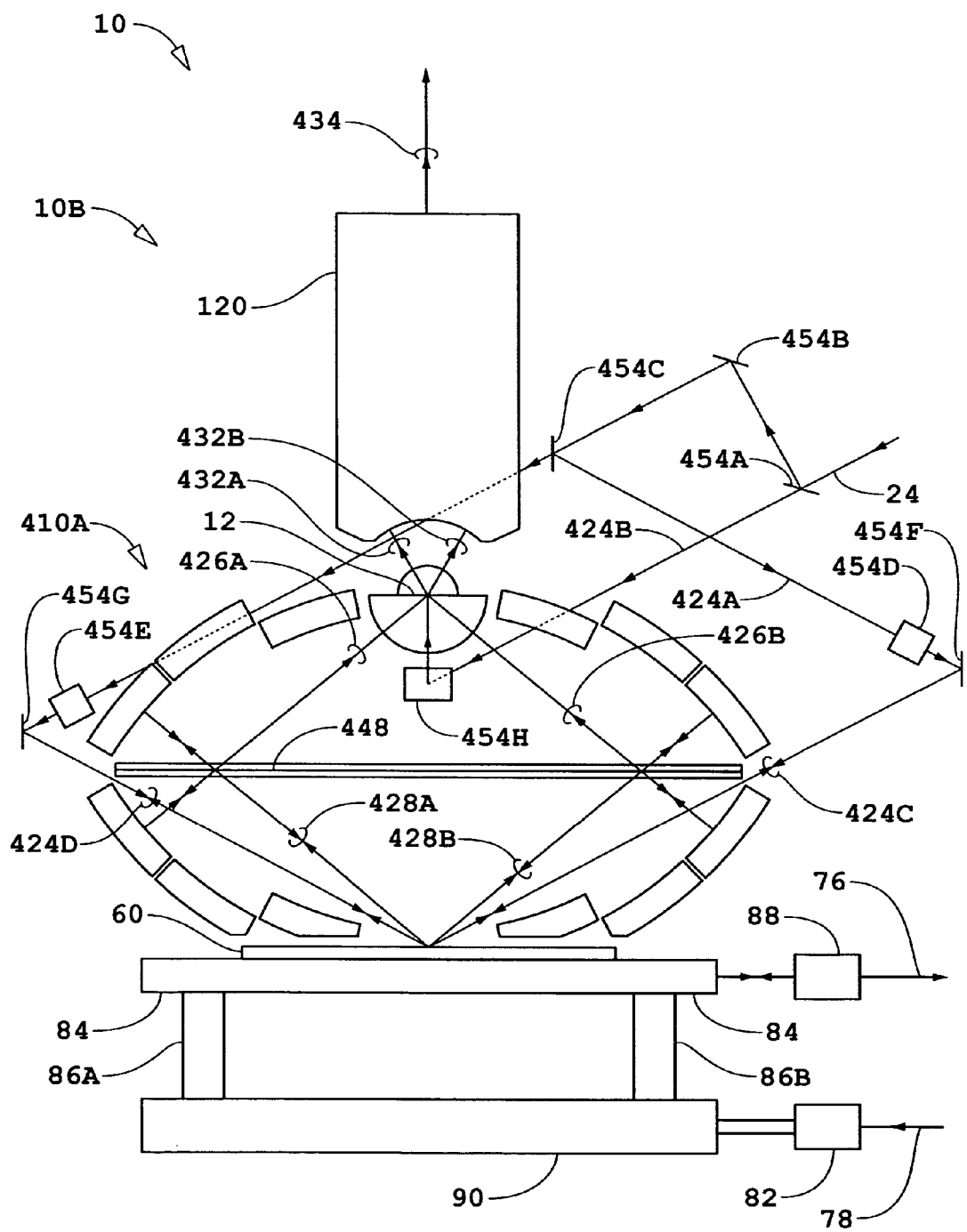
FIG. 2a is schematic diagram of a interferometer system that comprises a catadioptric imaging system.

Interferometer 10 of the first embodiment of the present invention is shown schematically in FIG. 2a. Interferometer 10 of the first embodiment comprises a first imaging system generally indicated as numeral 410A, and a second imaging system generally indicated as numeral 10B. The second imaging system 10B may comprise a low power microscope having a large working distance, e.g. Nikon ELWD and SLWD and Olympus LWD, ULWD, and ELWD objectives or a high resolution catadioptric imaging system such as described in cited U.S. Pat. No. 6,552,852 (ZI-38) and No. 6,717,736 (ZI-43).

The description of interferometer 10, source 18, beam-conditioner 22, detector 70, and electronic processor and controller 80 is the same as corresponding portions of the descriptions of catoptric and catadioptric imaging systems given in commonly owned U.S. Patent Provisional Patent Application No. 60/506,715 (ZI-56) entitled "Catoptric and Catadioptric Imaging Systems Comprising Pellicle Beam-Splitters And Non-Adaptive And Adaptive Catoptric Surfaces" by Henry A. Hill, David Fischer, and Steven Hamann; in cited U.S. Provisional Patent Application Ser. No. 60/602, 046 filed Aug. 16, 2004 (ZI-57) entitled "Apparatus and Method for Joint And Time Delayed Measurements of Components of Conjugated Quadratures of Fields of Reflected/Scattered and Transmitted/Scattered Beams by an Object in Interferometry"; and in U.S. patent application Ser. No. 60/506,715 filed Sep. 26, 2003 (ZI-56) entitled "Catoptric and Catadioptric Imaging Systems Comprising Pellicle Beam-Splitters And Non-Adaptive And Adaptive Catoptric Surfaces" by Henry A. Hill, David Fischer, and Steven Hamann for which the contents of the first of the two provisional patent applications and the utility patent application are incorporated herein in their entirety by reference.

A number of different catadioptric imaging systems for far-field and near-field interferometric confocal microscopy have been described such as in commonly owned U.S. Pat. No. 6,552,852 (ZI-38) entitled "Catoptric And Catadioptric Imaging Systems;" U.S. Pat. No. 6,717,736 (ZI-43) entitled "Catoptric And Catadioptric Imaging Systems;" U.S. Provisional Patent Applications No. 60/447,254 (ZI-40) entitled "Transverse Differential Interferometric Confocal Microscopy," No. 60/448,360 (ZI-41) entitled "Longitudinal Differential Interferometric Confocal Microscopy," No. 60/448, 250 (ZI-42) entitled "Thin Film Metrology Using Interferometric Confocal Microscopy," No. 60/442,982 (ZI-45) entitled "Interferometric Confocal Microscopy Incorporating Pinhole Array Beam-Splitter," No. 60/459,493 (ZI-48) entitled "Method For Manufacture Of Catadioptric Lens System," No. 60/459,425 (ZI-50) entitled "Apparatus and Method for Joint Measurement Of Fields Of Orthogonally Polarized Beams Scattered/Reflected By An Object In Interferometry," in cited No. 60/485,255 (ZI-53), No. 60/501,666 (ZI-54) entitled "Catoptric and Catadioptric Imaging Systems With Adaptive Catoptric Surfaces," and filed Sep. 18, 2004 (ZI-58) entitled "Catoptric Imaging Systems Comprising Pellicle and/or Aperture-Array Beam-Splitters and Non-Adaptive and/or Adaptive Catoptric Surfaces;" and U.S. patent application Ser. No. 10/778,371 (ZI-40) entitled "Transverse Differential Interferometric Confocal Microscopy," Ser. No. 10/782,057 (ZI-41) entitled "Longitudinal Differential Interferometric Confocal Microscopy," Ser. No. 10/782,058 (ZI-42) entitled "Thin Film Metrology Using Interferometric Confocal Microscopy," Ser. No. 10/765,229 (ZI-45) entitled "Interferometric Confocal Microscopy Incorporating Pinhole Array Beam-Splitter," Ser. No. 10/816,201 (ZI-48) entitled "Method For Manufacture Of Catadioptric Lens System," Ser. No. 10/816,180 (ZI-50) entitled "Apparatus and Method for Joint Measurement Of Fields Of Orthogonally Polarized Beams Scattered/Reflected By An Object In Interferometry," in cited patent application Ser. No. 60/485,255 filed Jul. 7, 2003 (ZI-53) entitled "Apparatus and Method for Ellipsometric Measurements with High Spatial Resolution," and aplication Ser. No. 60/501,666 filed Sep. 10, 2003 (ZI-54) entitled "Catoptric and Catadioptric Imaging Systems With Adaptive Catoptric Surfaces." The two cited patents, the seven not previously cited patent applications, and the eight not previously cited provisional patent applications are all by Henry A. Hill and the contents of each of which are incorporated herein in their entirety by reference. Other forms of non-catoptric or non-catadioptric microscopy imaging systems may be used for interferometer 10 without departing from the spirit or scope of the present invention.

With reference to FIG. 1a, source 18 is preferably a pulsed source that generates beam 20. Beam 20 is incident on and exits beam-conditioner 22 as input beam 24 that has two different frequency components for each polarization state or polarization component represented. Portions of the different frequency components of input beam 24 are spatially separated into two input beam components wherein each of the two spatially separated input beam components comprises a portion of each of the two different frequency components of each of the polarization states or polarization components represented. One of the two input beam components is split off by mirror 54A as measurement beam 24A and the other of the two input beam components is not incident on mirror 54A as reference beam 24B. The first and second portions corresponding to the two input beam components of input beam 24 have the same temporal window function.

A standing wave measurement beam is generated at substrate 60 from measurement beam 24A by a combination of a beam-splitter and two mirrors as shown diagrammatically in FIG. 1a. The reference beam is incident on a beam combining element in interferometer 10 (e.g. see beam combiner 12 in FIG. 2a) and may be a standing wave beam such as described for the measurement beam or a non-standing wave beam at the beam combining element.

Figure 1B:
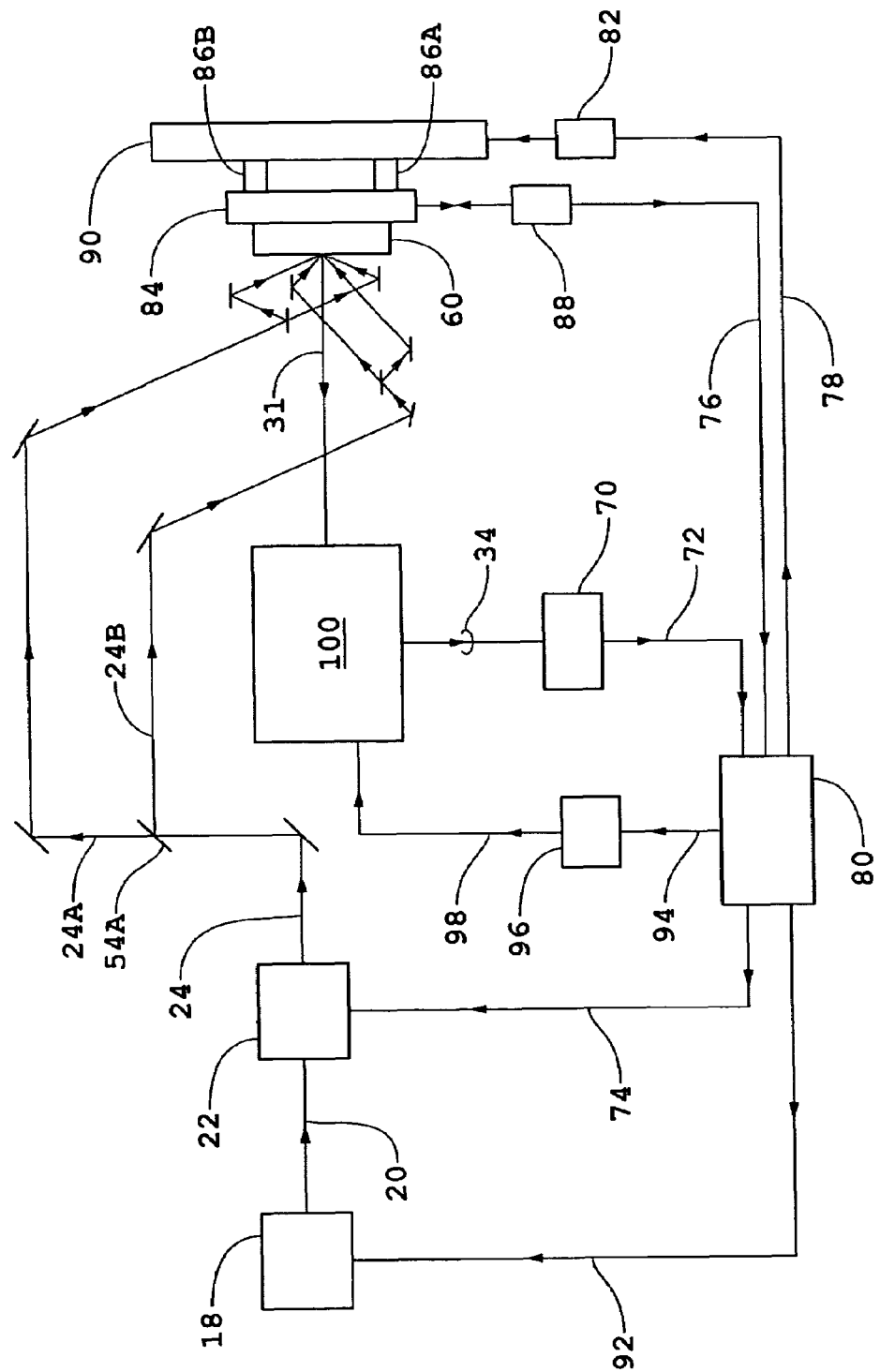
FIG. 1b is a schematic diagram of an interferometric system operating in a reflection mode configured with standing wave reference and measurement beams at reference and measurement objects, respectively, wherein the reference and measurement objects are the same object.

The interferometer system shown diagrammatically in FIG. 1b represents an interferometric imaging system operating in a reflecting mode to measure components of conjugated quadratures of fields reflected/scattered by substrate 60 for certain embodiments of the present invention wherein substrate 60 serves as both the reference and measurement beam objects simultaneously and the measurement and reference beams comprise standing wave beams at the respective reference and measurement objects, i.e. substrate 60. Referring to FIG. 1b, the interferometer system is shown diagrammatically comprising an imaging system 100, source 18, beam-conditioner 22, detector 70, electronic processor and controller 80, and measurement object shown as substrate 60.

In the interferometer system shown in FIG. 1b, both the measurement beam and the reference beam comprise standing wave beams at substrate 60. The return beam 31 is the interference beam representing the combined return measurement and reference beams from substrate 60. The plane of the two measurement beams forming the standing wave measurement beam at substrate 60 and the plane of the two reference beams forming the standing wave reference beam at substrate 60 are both shown as lying in the plane of FIG. 1b in order to simplify the diagram for illustration purposes only. In practice, the two planes will generally be at some angle with respect to each other, e.g., orthogonal.

Figure 1C:
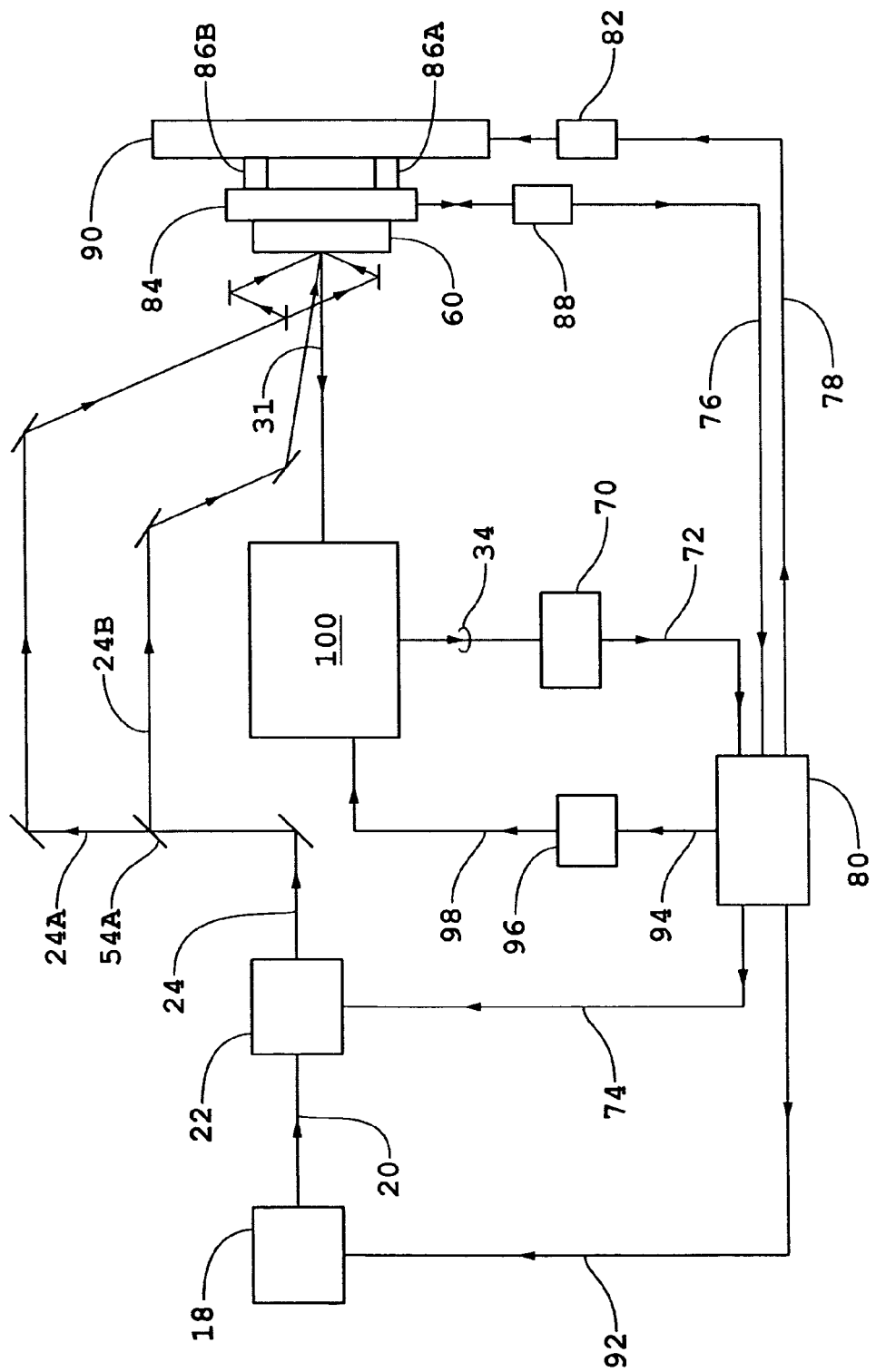
FIG. 1c is a schematic diagram of an interferometric system operating in a reflection mode configured with non-standing wave reference beam and a standing wave measurement beams at reference and measurement objects, respectively, wherein the reference and measurement objects are the same object.

The interferometer system shown diagrammatically in FIG. 1c represents an interferometric imaging system operating in a reflecting mode to measure amplitudes of conjugated quadratures of fields reflected/scattered by substrate 60 for certain embodiments of the present invention wherein substrate 60 serves as both the reference and measurement beam objects simultaneously and the measurement and reference beams comprise a standing wave measurement beam and a non-standing wave reference beam, respectively, at the measurement substrate 60. Referring to FIG. 1c, the interferometer system is shown diagrammatically comprising an imaging system 100, source 18, beam-conditioner 22, detector 70, electronic processor and controller 80, and measurement object shown as substrate 60. Imaging system 100 may comprise the imaging system 10 with respect to an imaging function.

In the interferometer system shown in FIG. 1c, the measurement beam comprises a standing wave beam at substrate 60. The reference beam is shown as lying in the plane of FIG. 1c with a non-zero angle of incidence in order to simplify the diagram for illustration purposes only. In practice, the direction of propagation of the reference beam may lie in different plane and the angle of incidence may be zero.

Figure 1D:
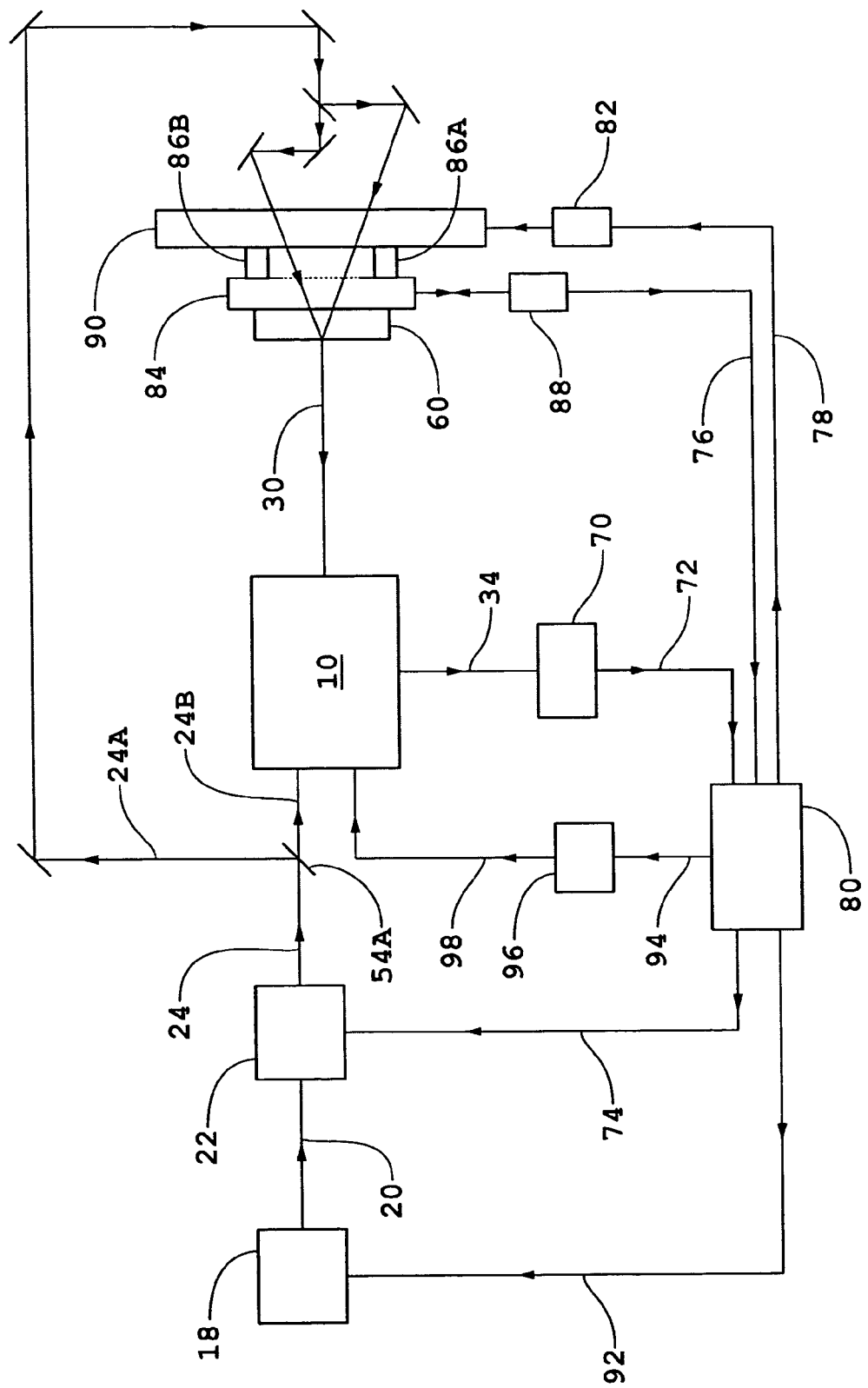
FIG. 1d is a schematic diagram of an interferometric system operating in a transmission mode configured with a standing wave measurement beam at a measurement object.

The interferometer system shown diagrammatically in FIG. 1d represents an interferometer imaging system operating in the transmission mode to measure the components of conjugated components of fields transmitted/scattered by substrate 60 and further represents embodiments of the present invention wherein the measurement beam comprises a standing wave beam at substrate 60.

Figure 1E:
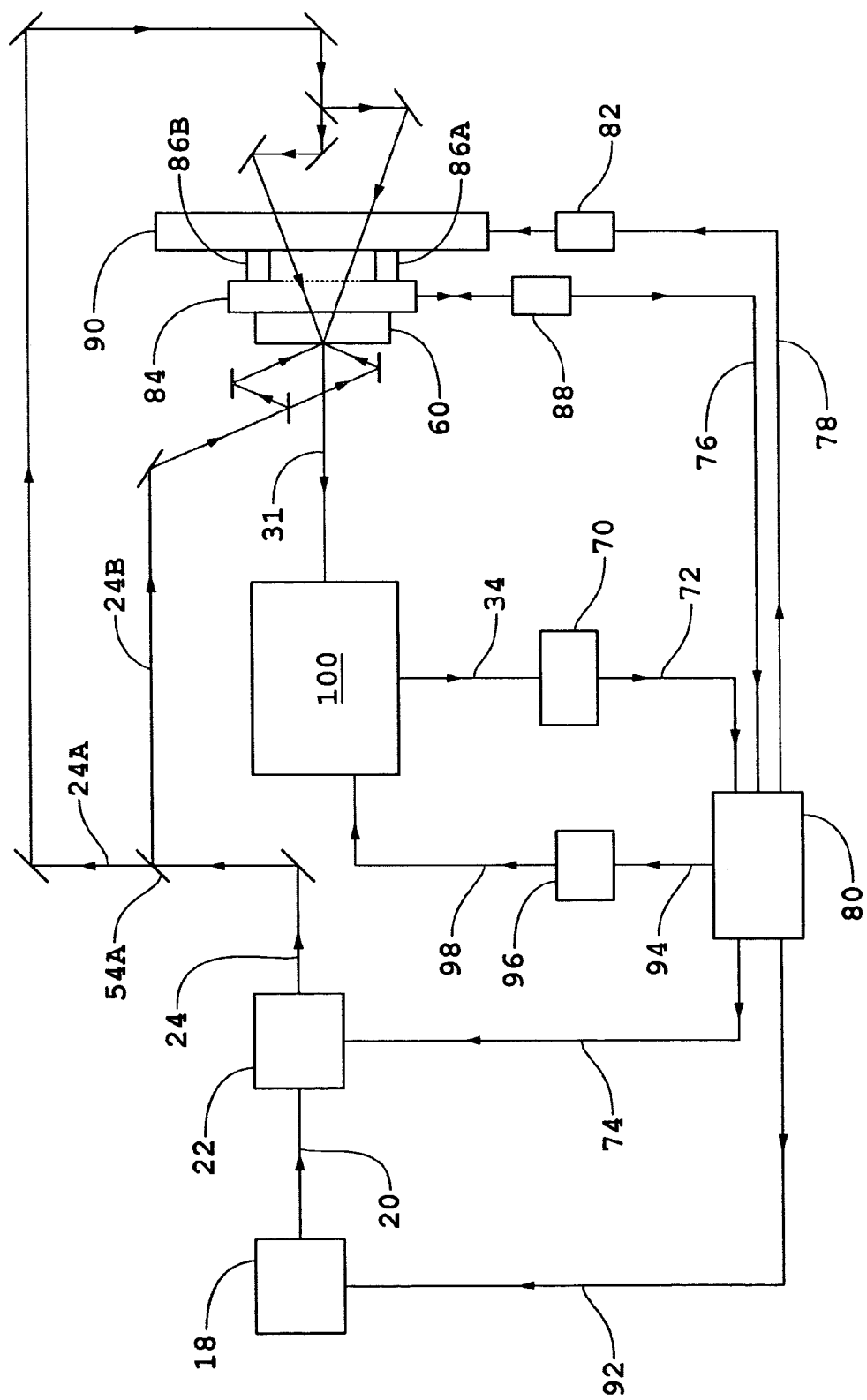
FIG. 1e is a schematic diagram of an interferometric system operating in a transmission mode configured with standing wave reference and measurement beams at reference and measurement objects, respectively, wherein the reference and measurement objects are the same object.

The interferometer system shown diagrammatically in FIG. 1e represents an interferometric imaging system operating in a transmission mode to measure amplitudes of conjugated quadratures of fields transmitted/scattered by substrate 60 for certain embodiments of the present invention wherein substrate 60 serves as both the reference and measurement beam objects simultaneously and the measurement and reference beams comprise standing wave beams at substrate 60. Referring to FIG. 1e, the interferometer system is shown diagrammatically comprising an imaging system 100, source 18, beam-conditioner 22, detector 70, electronic processor and controller 80, and measurement object shown as substrate 60.

In the interferometer system shown in FIG. 1e, both the measurement beam and the reference beam comprise standing wave beams at substrate 60. The plane of the two measurement beams forming the standing wave measurement beam at substrate 60 and the plane of the two reference beams forming the standing wave reference beam at substrate 60 are both shown as lying in the plane of FIG. 1e in order to simplify the diagram for illustration purposes only. In practice, the two planes will generally be at some angle with respect to each other, e.g., orthogonal.

Figure 1F:
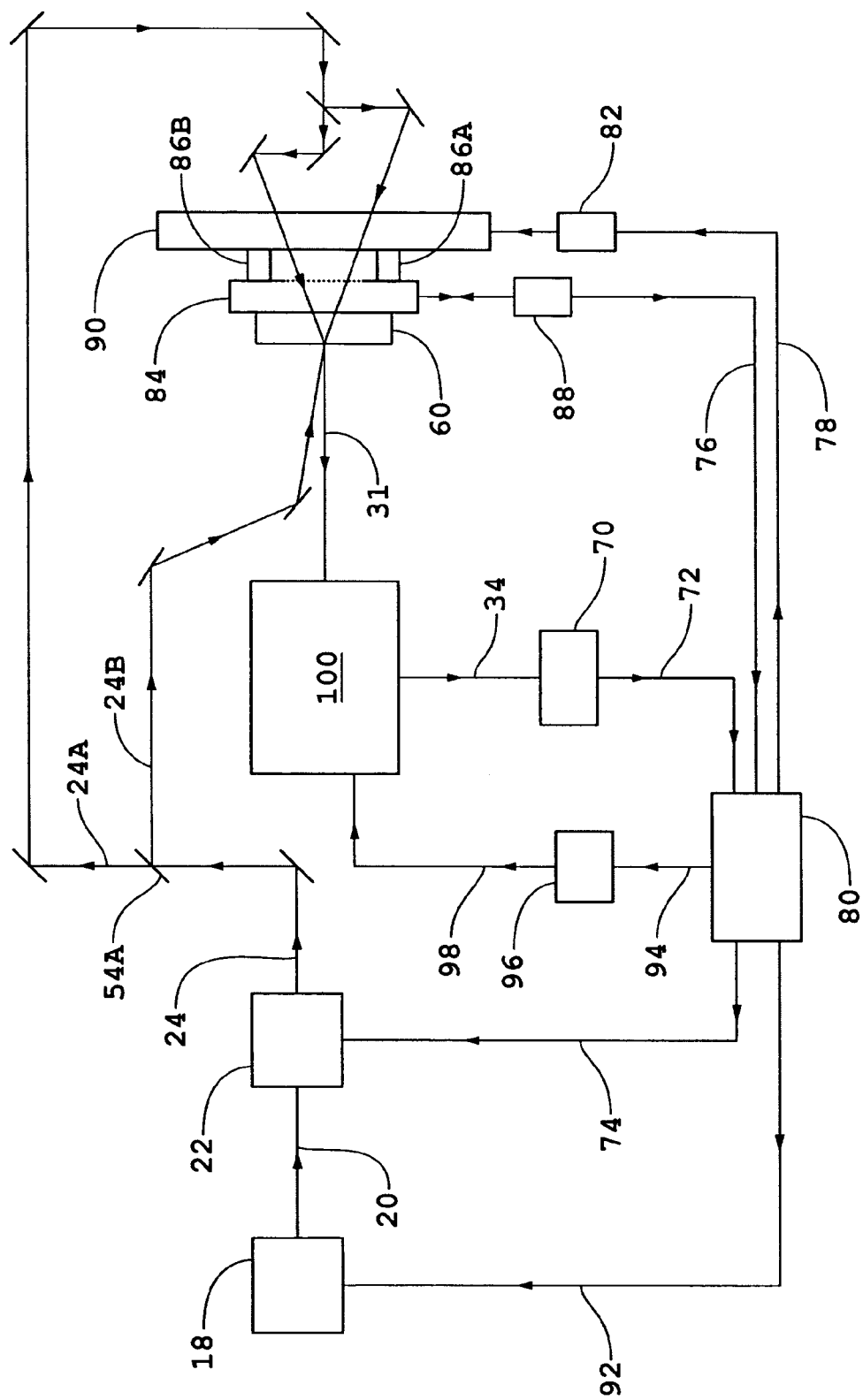
FIG. 1f is a schematic diagram of an interferometric system operating in a transmission mode configured with non-standing wave reference beam and a standing wave measurement beams at reference and measurement objects, respectively, wherein the reference and measurement objects are the same object.

The interferometer system shown diagrammatically in FIG. 1f represents an interferometric imaging system operating in a transmission mode to measure components of conjugated quadratures of fields transmitted/scattered by substrate 60 for certain embodiments of the present invention wherein substrate 60 serves as both the reference and measurement beam objects simultaneously and the measurement and reference beams comprise a standing wave measurement beam and a non-standing wave reference beam, respectively, at measurement object 60. Referring to FIG. 1f, the interferometer system is shown diagrammatically comprising an imaging system 100, source 18, beam-conditioner 22, detector 70, electronic processor and controller 80, and measurement object shown as substrate 60.

Polarization States and Spatial Properties of Measurement and Reference Beams

Reference is made to FIGS. 1g-1k for the discussion of properties of measurement and reference beams at an interface corresponding to the interferometric and non-interferometric microscopy systems operating in a reflection mode. The interface may be either a surface of substrate 60 or a surface associated with an element of an interferometer serving the function of a beam combining element.

Figure 1G:
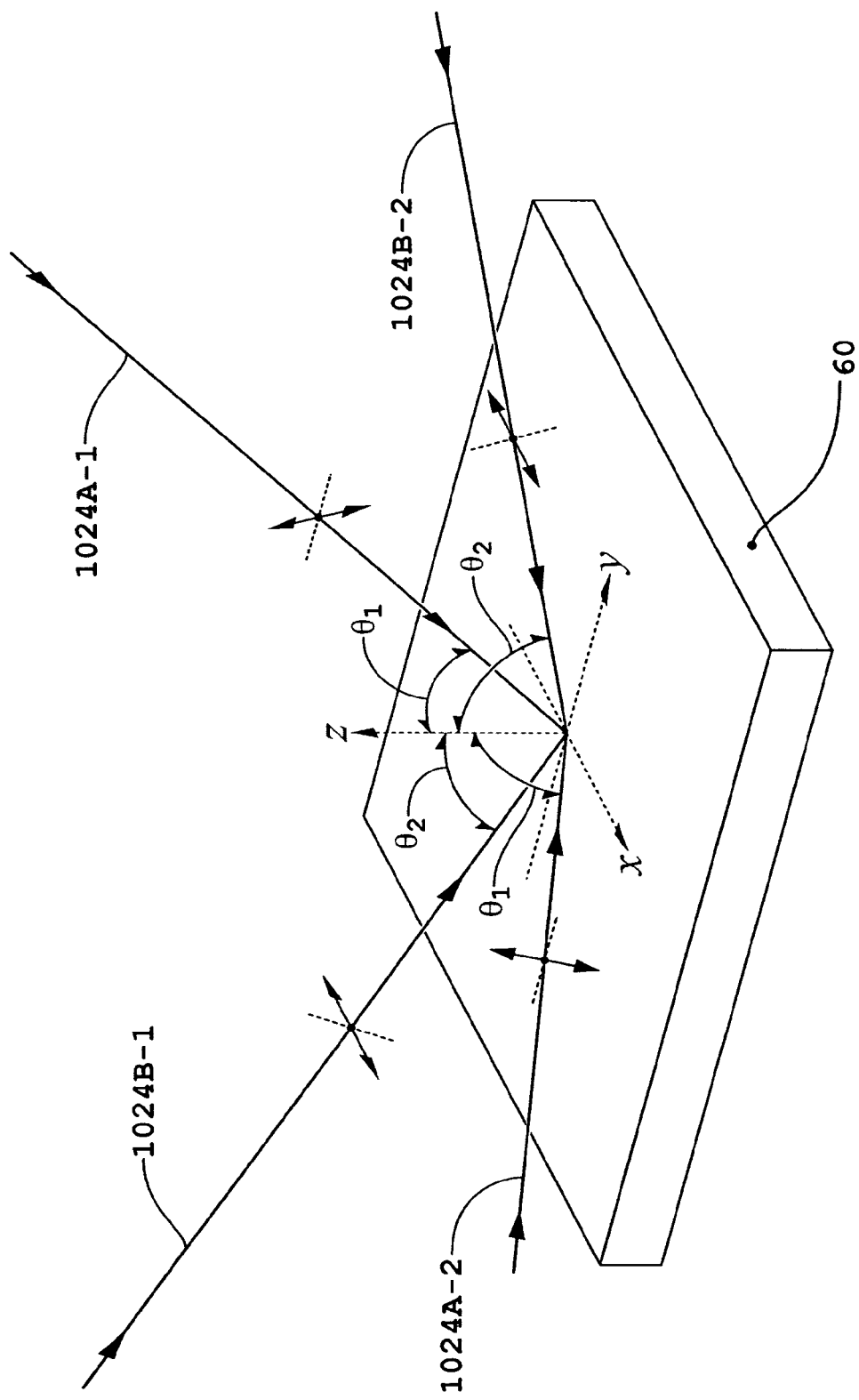
FIG. 1g is a schematic diagram of two beams in respective s and p polarization states incident on a substrate.

In FIG. 1g, beams 1024A-1 and 1024A-2 in a p polarization states are measurement beams derived from measurement beam 24A as shown in FIG. 1b and superimposed at a spot on substrate 60 to form a standing wave measurement beam. The angles of incidence for measurement beams 1024A-1 and 1024A-2 are nominally the same and indicated as $\theta_1$ in FIG. 1g. The planes of incidence for measurement beams 1024A-1 and 1024A-2 are coplanar with the x-z plane. Beams 1024B-1 and 1024B-2 in s polarization states are reference beams derived from reference beam 24B as shown in FIG. 1b and superimposed at the spot on substrate 60 to form a standing wave reference beam. The angles of incidence for reference beams 1024B-1 and 1024B-2 are nominally the same and indicated as $\theta_2$ in FIG. 1g. The planes of incidence for reference beams 1024B-1 and 1024B-2 are coplanar and are shown as coplanar with the y-z plane in FIG. 1g. However, the coplanar planes of incidence of reference beams 1024B-1 and 1024B-2 may be at some other orientation with respect to the y-z plane.

When the electrical interference signal 72 is subsequently generated by detector 70 (see FIG. 1b) by the detection of a mixed beam 32 comprising the reflected/scattered standing wave measurement beam and the reflected/scattered standing wave reference beam, the standing wave measurement beam will have polarization components in each of the x and z directions and the standing wave reference beam will have a polarization parallel to the x-y plane and orthogonal to the coplanar planes of incidence of reference beams 1024B-1 and 1024B-2 with respect to the y-z plane.

Figure 1H:
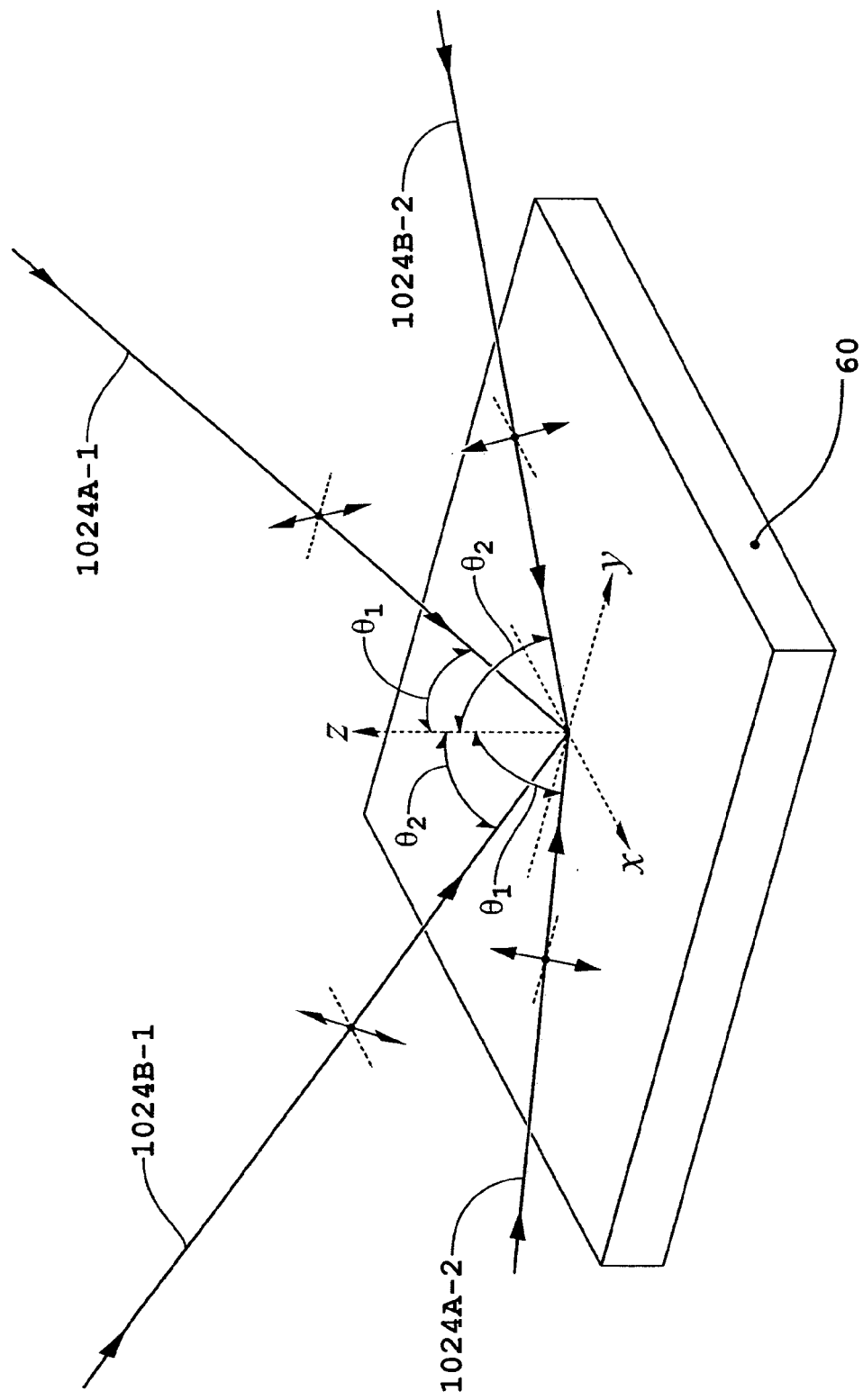
FIG. 1h is a schematic diagram of two beams in respective p polarization states incident on a substrate.

In FIG. 1h, beams 1024A-1 and 1024A-2 in p polarization states are measurement beams derived from measurement beam 24A as shown in FIG. 1b and superimposed at a spot on substrate 60 to form a standing wave measurement beam. The angles of incidence for measurement beams 1024A-1 and 1024A-2 are nominally the same and indicated as $\theta_1$ in FIG. 1h. The planes of incidence for measurement beams 1024A-1 and 1024A-2 are coplanar with the x-z plane. Beams 1024B-1 and 1024B-2 in a p polarization state are reference beams derived from reference beam 24B and superimposed at the spot on substrate 60 to form a standing wave reference beam. The angles of incidence for reference beams 1024B-1 and 1024B-2 are nominally the same and indicated as $\theta_2$ in FIG. 1h. The planes of incidence for reference beams 1024B-1 and 1024B-2 are coplanar and are shown as coplanar in the y-z plane in FIG. 1h. However, the coplanar planes of incidence of reference beams 1024B-1 and 1024B-2 may be at some other orientation with respect to the y-z plane.

When the electrical interference signal 72 is subsequently generated by detector 70 (see FIG. 1b) by the detection of a mixed beam comprising the reflected/scattered standing wave measurement beam and the reflected/scattered standing wave reference beam, the standing wave measurement beam will have polarization components in the x and z directions and the standing wave reference beam will have a polarization component in the z direction and a polarization component parallel to x-y plane and parallel to the coplanar planes of incidence of reference beams 1024B-1 and 1024B-2 with respect to the y-z plane.

Figure 1I:
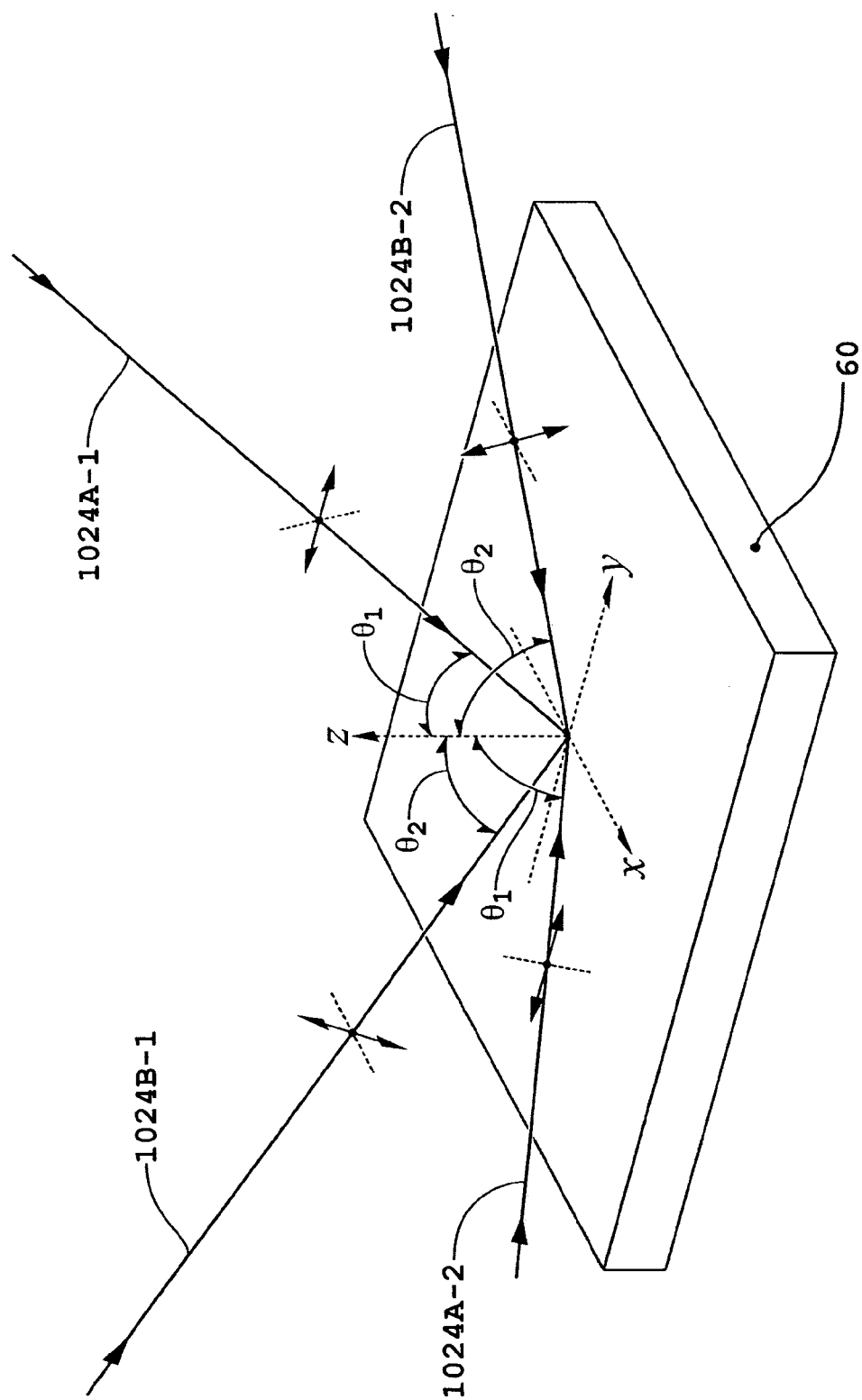
FIG. 1i is a schematic diagram of two beams in respective s and p polarization states incident on a substrate.

In FIG. 1i, beams 1024A-1 and 1024A-2 in s polarization states are measurement beams derived from measurement beam 24A as shown in FIG. 1b and superimposed at a spot on substrate 60 to form a standing wave measurement beam. The angles of incidence for measurement beams 1024A-1 and 1024A-2 are nominally the same and indicated as $\theta_1$ in FIG. 1i. The planes of incidence for measurement beams 1024A-1 and 1024A-2 are coplanar with the x-z plane. Beams 1024B-1 and 1024B-2 in p polarization states are reference beams derived from reference beam 24B and superimposed at the spot on substrate 60 to form a standing wave reference beam. The angles of incidence for reference beams 1024B-1 and 1024B-2 are nominally the same and indicated as $\theta_2$ in FIG. 1i. The planes of incidence for reference beams 1024B-1 and 1024B-2 are coplanar and are shown as coplanar with the y-z plane in FIG. 1i. However, the coplanar planes of incidence of reference beams 1024B-1 and 1024B-2 may be at some other orientation with respect to the y-z plane.

When the electrical interference signal 72 is subsequently generated by detector 70 (see FIG. 1b) by the detection of a mixed beam 32 comprising the reflected/scattered standing wave measurement beam and the reflected/scattered standing wave reference beam, the standing wave measurement beam will have a polarization component in the y direction and the standing wave reference beam will have a polarization component in z direction and a polarization component parallel to x-y plane and parallel to the coplanar planes of incidence of reference beams 1024B-1 and 1024B-2.

Figure 1J:
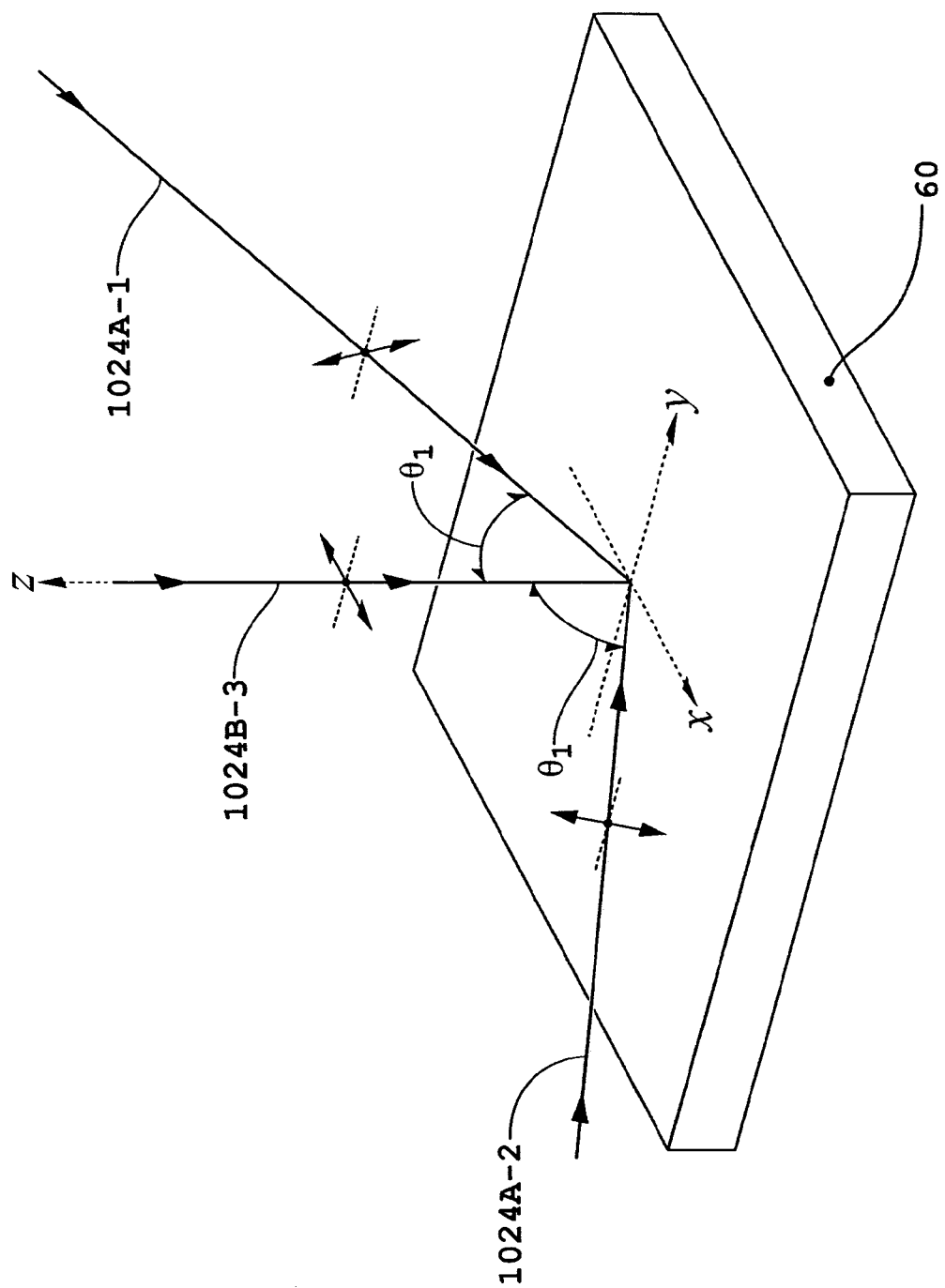
FIG. 1j is a schematic diagram of two beams incident on a substrate with one of the beams in a p polarization state.

In FIG. 1j, beams 1024A-1 and 1024A-2 in a p polarization state are measurement beams derived from measurement beam 24A and superimposed at a spot on substrate 60 to form a standing wave measurement beam. The angles of incidence for measurement beams 1024A-1 and 1024A-2 are nominally the same and indicated as $\theta_1$ in FIG. 1j. The planes of incidence for measurement beams 1024A-1 and 1024A-2 are coplanar with the x-z plane. The reference beam 1024B-3 is a non-standing wave beam derived from reference beam 24B (see FIG. 1c) and is incident on substrate 60 at the spot at normal incidence. The polarization of reference beam 1024B-3 is shown in the x-z plane in FIG. 1j. However, the plane of polarization of reference beam 1024B-3 may be at some other orientation with respect to the x-z plane and the angle of incidence may be non-zero.

When the electrical interference signal 72 is subsequently generated by detector 70 (see FIG. 1c) by the detection of a mixed beam comprising the reflected/scattered standing wave measurement beam and the reflected/scattered non-standing wave reference beam, the standing wave measurement beam will have polarization components in each of the x and z directions and the non-standing wave reference beam will have a polarization in the x-y plane and parallel to x-z plane as shown in FIG. 1j. However, the polarization of reference beam 1024B-3 may be at some other orientation with respect to the x-z plane.

Figure 1K:
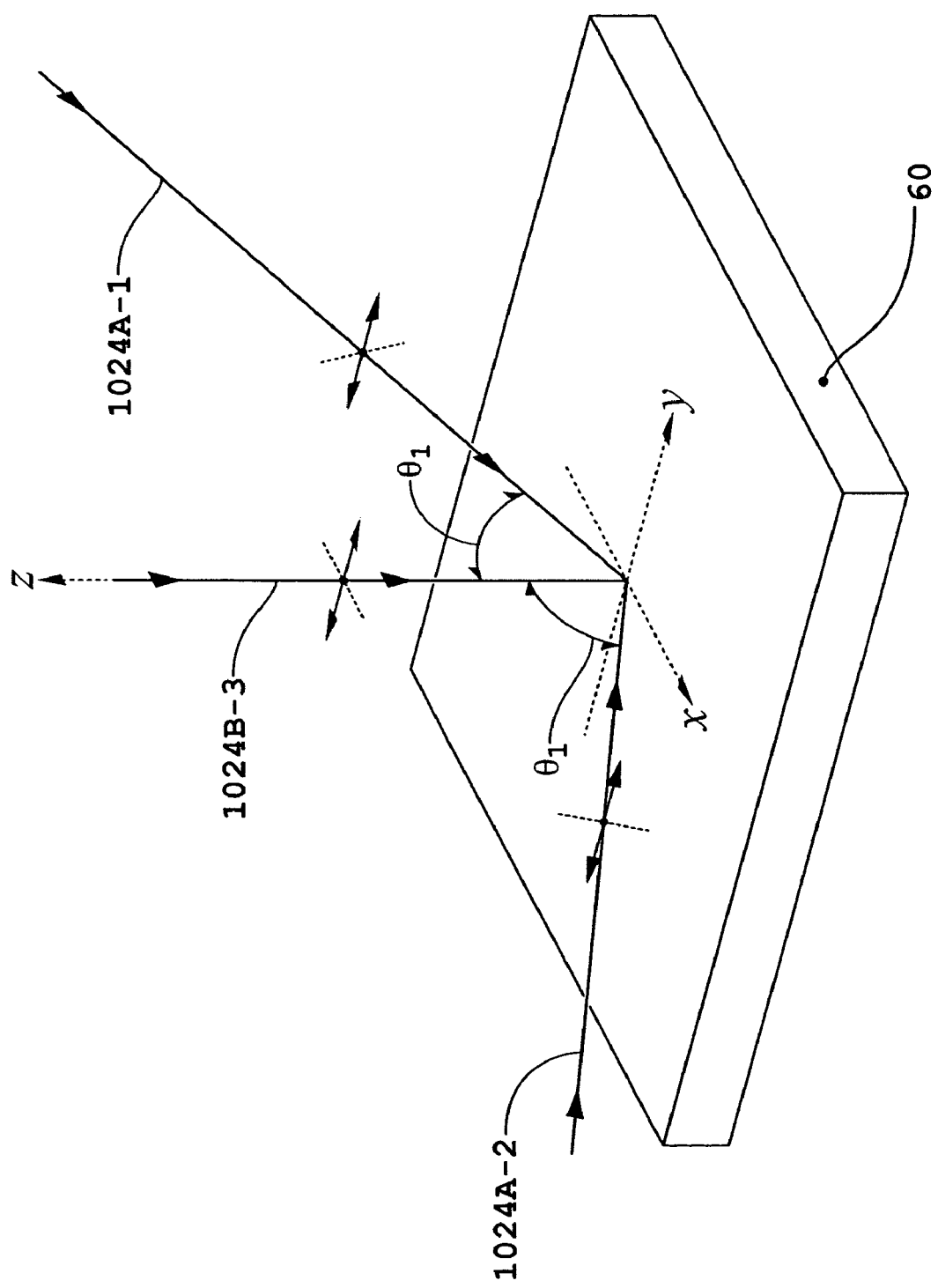
FIG. 1k is a schematic diagram of two beams incident on a substrate with one of the beams in a s polarization state.
Figure 11:
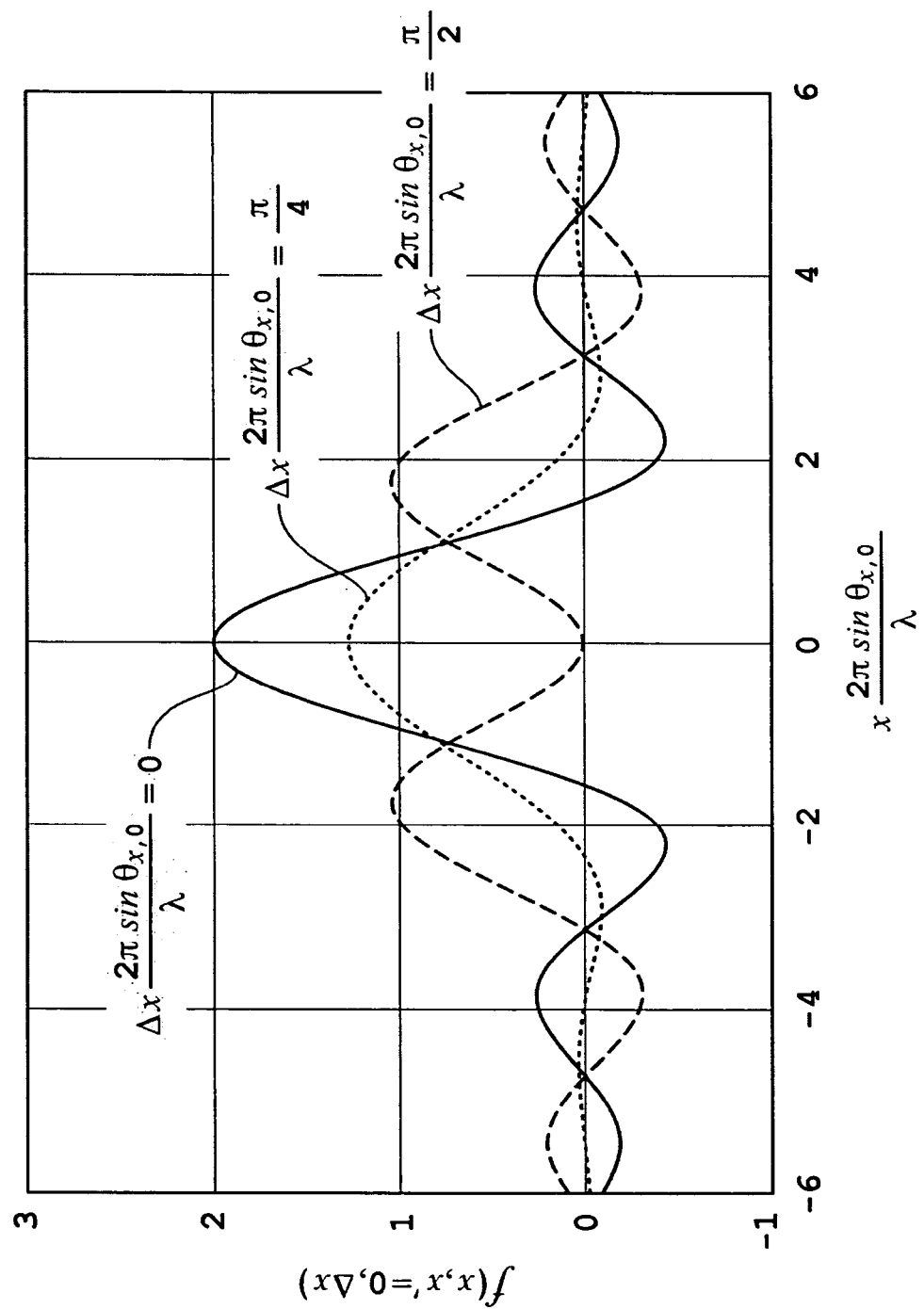

In FIG. 1k, beams 1024A-1 and 1024A-2 in s polarization states are measurement beams derived from measurement beam 24A and superimposed at a spot on substrate 60 to form a standing wave measurement beam. The angles of incidence for the two measurement beams are nominally the same and indicated as $\theta_1$ in FIG. 1k. The planes of incidence for measurement beams 1024A-1 and 1024A-2 are coplanar with the x-z plane. The beam 1024B-3 is a non-standing wave beam derived from reference beam 24B and incident on substrate 60 at the spot at normal incidence. The polarization of reference beam 1024B-3 is in the y-z plane. However, plane of polarization of reference beam 1024B-3 may be at some other orientation with respect to the y-z plane and the angle of incidence may be non-zero.

When the electrical interference signal 72 is subsequently generated by detector 70 (see FIG. 1c) by the detection of a mixed beam 32 comprising the reflected/scattered standing wave measurement beam and the reflected/scattered non-standing wave reference beam, the standing wave measurement beam will have only a y polarization component and the non-standing wave reference beam will have a polarization in the x-y plane, where y is a unit vector in the y-direction and in the y-z such as shown in FIG. 1k. However, the polarization of reference beam 1024B-3 may be at some other orientation with respect to the y-z plane.

The description of properties of measurement and reference beams at an interface corresponding to the interferometric and non-interferometric microscopy systems operating in a transmission mode is the same as corresponding portions of the description given for FIGS. 1g-1k with the transformation:

$$\theta_1 \Rightarrow \pi - \theta_1. \quad (1)$$

The description of the reference beam and measurement beam properties at a beam combining element in interferometer 10 when comprising standing wave beams is the same as corresponding portions of the description given for FIGS. 1g-1k.

Properties of Electric Fields Associated with Incident Beams

A general description of the electric fields of the measurement and reference beams in FIGS. 1g and 1h is next given. Referring to FIGS. 1g and 1h, the measurement beam electric field $E_p^{(1)}$ of the p standing wave beam at substrate 60 is formed by the superposition of the two measurement beams 1024A-1 and 1024A-2 with p polarizations propagating in the x-z plane. The electric field $E_p^{(1)}$ may be written as $$E_p^{(1)} = \begin{cases} 2E_{p,0}^{(1)}\begin{bmatrix} ix\cos\theta_1\sin(k\sin\theta_1 x) + \\ z\sin\theta_1\cos(k\sin\theta_1 x) \end{bmatrix} e^{-ik\cos\theta_1 z}, & z \geq 0, \\ 2E_{p,0}^{\prime(1)}\begin{bmatrix} ix\cos\theta_1'\sin(kn'\sin\theta_1' x) + \\ z\sin\theta_1'\cos(kn'\sin\theta_1' x) \end{bmatrix} e^{-ikn'\cos\theta_1' z}e^{k\kappa' z\sec\theta_1'}, & z < 0, \end{cases} \quad (2)$$

where $E_{p,0}^{(1)}$ and $E_{p,0}^{\prime r(1)}$ are the amplitudes of the electric field component of the incident and refracted beams, respectively, $n_1'$ and $\kappa'$ are the real and imaginary components of the complex refractive index for $z<0$, $\theta'$ is the angle of refraction of the beam, $i=\sqrt{(-1)}$, $\lambda$ is the wavelength for the two beams and wavenumber $k=2\pi/\lambda$, and x and z are a unit vectors in the x- and z-directions, respectively. The relative amplitudes $E_{p,0}^{\prime r(1)}/E_{p,0}^{(1)}$ can be found for example in Section 7.3 of the book by J. D. Jackson entitled *Classical Electrodynamics* (Wiley, Second Edition). The time dependence exp[iωt] of $E_p^{(1)}$ has been suppressed in Equation (2) and in subsequent equations where ω is the angular frequency of the beams.

The electric field $E_s^{(2)}$ of the s standing wave reference beam at an interface in FIG. 1g is formed by the superposition of two beams propagating in the y-z plane. The electric field $E_s^{(2)}$ may be written as:

$$E_s^{(2)} = \begin{cases} 2E_{s,0}^{(2)}[x\cos(k\sin\theta_2 y)]e^{-ik\cos\theta_2 z}, & z \geq 0, \\ 2E_{s,0}^{\prime(2)}[x\cos(kn'\sin\theta_2' y)]e^{-ikn'\cos\theta_2' z}e^{k\kappa' z\sec\theta_2'}, & z < 0. \end{cases} \quad (3)$$

where $E_{s,0}^{(2)}$ and $E_{s,0}^{\prime r(2)}$ are the amplitudes of the electric field component of the incident and refracted beams, respectively, and $\theta_2$ is the angle of incidence of the two beams. The relative amplitudes $E_{s,0}^{\prime r(2)}/E_{s,0}^{(2)}$ can be found for example in cited Section 7.3 of the book by Jackson.

The electric field $E_p^{(2)}$ of the p standing wave reference beam at an interface in FIG. 1h is formed by the superposition of two beams propagating in the y-z plane. The electric field $E_p^{(2)}$ may be written as:

$$E_p^{(2)} = \begin{cases} 2E_{p,0}^{(2)}\begin{bmatrix} iy\cos\theta_2\sin(k\sin\theta_2 y) + \\ z\sin\theta_2\cos(k\sin\theta_2 y) \end{bmatrix} e^{-ik\cos\theta_2 z}, & z \geq 0, \\ 2E_{p,0}^{\prime(2)}\begin{bmatrix} iy\cos\theta_2'\sin(kn'\sin\theta_2' y) + \\ z\sin\theta_2'\cos(kn'\sin\theta_2' y) \end{bmatrix} e^{-ikn'\cos\theta_2' z}e^{k\kappa' z\sec\theta_2'}, & z < 0, \end{cases} \quad (4)$$

where $E_{p,0}^{(2)}$ and $E_{p,0}^{\prime r(2)}$ are the amplitudes of the electric field component of the incident and refracted beams, respectively, The measurement beam electric field $E_s^{(1)}$ in FIG. 1i of a s standing wave measurement beam at substrate 60 is formed by the superposition of two measurement beams propagating in the x-z plane. The electric field $E_s^{(1)}$ may be written as $$E_s^{(1)} = \begin{cases} 2E_{s,0}^{(1)}[y\cos(k\sin\theta_1 x)]e^{-ik\cos\theta_1 z}, & z \geq 0, \\ 2E_{s,0}^{\prime(1)}[y\cos(kn'\sin\theta_1' x)]e^{-ikn'\cos\theta_1' z}e^{k\kappa' z\sec\theta_1'}, & z < 0. \end{cases} \quad (5)$$

The description of the measurement beam electric fields in FIGS. 1j and 1k are the same as the description of the measurement beam electric fields in FIGS. 1h and 1i, respectively.

Lateral Resolution

The discussion of the lateral resolution is in terms of properties of the electrical interference signal 72 that results from two laterally separated infinitesimal elements of substrate 60. The discussion of the lateral resolution is also presented for an optical system that has a square aperture at the respective imaging system pupil so as to simplify the discussion although other apertures, e.g. round, or apodized apertures may be used.

The amplitude of a beam reflected/scattered by an infinitesimal element of substrate 60 imaged by interferometer 10 or 100 will be proportional to the convolution of the point transfer function for the imaging system of interferometer 10 or 100 with the product of the reflection/scattering coefficient of the infinitesimal element and the corresponding amplitude of beam incident on the infinitesimal element. The primary contribution to the infinitesimal contribution $\delta S_1$ to the electrical interference signal for the case of reference and measurement beams both comprising standing wave beams at substrate 60 such as shown in FIG. 1h will be due to the z components of the measurement and reference fields given by Equations (2) and (4), respectively. The contribution of the x and y components will contribute as second order terms because of the orthogonality of the x, y, and z components. The primary contribution $\delta S_1$ is accordingly written as $$\delta S_1(x, x', y, y', \Delta z) = 8CR(x, y)E_{p,0}^{(1)}E_{p,0}^{(2)} \times \sin\theta_1 \quad (6)$$
$$\cos(k\sin\theta_1 x)\text{sinc}[k\sin\theta_{x,0}(x-x')] \times \sin\theta_2\cos(k\sin\theta_2 y)\text{sinc}$$
$$[k\sin\theta_{y,0}(y-y')] \times \delta V\cos[\varphi_{1,2} + \varphi + k(\cos\theta_1 - \cos\theta_2)\Delta z]$$

where the infinitesimal element of substrate 60 is located at (x, y, z=0), x' and y' are coordinates in the image space of the imaging system, $\delta V$ is the infinitesimal volume of the infinitesimal element, R(x, y) is the reflection/scattering coefficient for the infinitesimal element, $\sin\theta_{x,0}$ and $\sin\theta_{y,0}$ represent the numerical aperture of the imaging system in the x and y directions, respectively, $\Delta z$ is the displacement of the surface of substrate 60 from z=0, phase $\phi$ is the phase between measurement and reference beams determined by beam conditioner 22 or interferometer 10 as controlled by electronic processor and controller 80, phase $\phi_{1,2}$ is the phase between the reflected/scattered reference and measurement beam components of beam 32 for $\phi$=0, and C is a proportionality constant.

If the properties of $\delta S_1$ given by Equation (6) are examined as a function of x' or y', the inferred resolution $R_{x'}$ and $R_{y'}$ of the imaging system in the x' and y' directions, respectively, are $$R_{x'} \cong \frac{\lambda}{2\sin\theta_{x,0}}, \qquad (7)$$

$$R_{y'} \cong \frac{\lambda}{2\sin\theta_{y,0}}. \qquad (8)$$

However, if the properties of $\delta S_1$ given by Equation (6) are examined as a function of x or y, the inferred resolution $R_x$ and $R_y$ of the imaging system in the x' and y' directions, respectively, are different from $R_{x'}$ and $R_{y'}$, respectively, given by Equations (7) and (8). For the discussion of the resolutions $R_x$ and $R_y$, the contributions to the electrical interference signal $\delta S_2$ of two equal infinitesimal volume elements located in the surface of substrate 60 are examined. For the two infinitesimal volume elements located at x±$\Delta$x, the corresponding $\delta S_2$ is $$\delta S_2(x, x', y, y', \Delta z) = 8CR(x, y)E_{p,0}^{(1)}E_{p,0}^{(2)} \times \sin\theta_1 \qquad (9)$$
$$\left\{ \begin{array}{l} \cos[k\sin\theta_1(x+\Delta x)]\mathrm{sinc}[k\sin\theta_{x,0}(x-x'+\Delta x)] + \\ \cos[k\sin\theta_1(x-\Delta x)]\mathrm{sinc}[k\sin\theta_{x,0}(x-x'-\Delta x)] \end{array} \right\} \times$$
$$\sin\theta_2\cos(k\sin\theta_2 y)\mathrm{sinc}[k\sin\theta_{y,0}(y-y')] \times$$
$$\delta V\cos[\varphi_{1,2} + \varphi + k(\cos\theta_1 - \cos\theta_2)\Delta z]$$

where it has been assumed that R(x,y) and $\phi_{1,2}$ are the same for the two infinitesimal volume elements for the purposes of simplifying the discussion without loss of important properties. The dependence of $\delta S_2$ on x is determined by the factor $f(x,x',\Delta x)$ where $$f(x, x', \Delta x) = +\left\{ \begin{array}{l} \cos[k\sin\theta_1(x+\Delta x)]\mathrm{sinc}[k\sin\theta_{x,0}(x-x'+\Delta x)] + \\ \cos[k\sin\theta_1(x-\Delta x)]\mathrm{sinc}[k\sin\theta_{x,0}(x-x'-\Delta x)] \end{array} \right\}. \qquad (10)$$

Function $f(x,x',\Delta x)$ is shown in FIG. 1*l* as a function of x for different values of $\Delta x$, i.e. ($\Delta x \sin\theta_1/\lambda$)=0, $\pi/4$, $\pi/2$, for the case of $\sin\theta_1 = \sin\theta_{x,0}$.

It is evident on examination of FIG. 1*l* that lateral resolution $R_x$ is expressed by the equation $$R_x \cong \frac{\lambda}{4\sin\theta_{x,0}}. \qquad (11)$$

The lateral resolution $R_y$ is determined by a similar analysis to be accordingly $$R_y \cong \frac{\lambda}{4\sin\theta_{y,0}}. \qquad (12)$$

The lateral resolutions $R_x$ and $R_y$ expressed by Equations (11) and (12) are smaller by a factor of 2 than the lateral resolutions $R_{x'}$ and $R_{y'}$, respectively, expressed by Equations (7) and (8), respectively. Thus the lateral spatial resolution is enhanced by a factor of approximately 2 when using standing wave reference and measurement beams at the measurement object and the reference and measurement objects are the same object simultaneously and by using a data acquisition procedures and analysis of the measured conjugated quadratures based on object space coordinates, i.e. x instead of x' and y instead of y'.

Figure 2B:
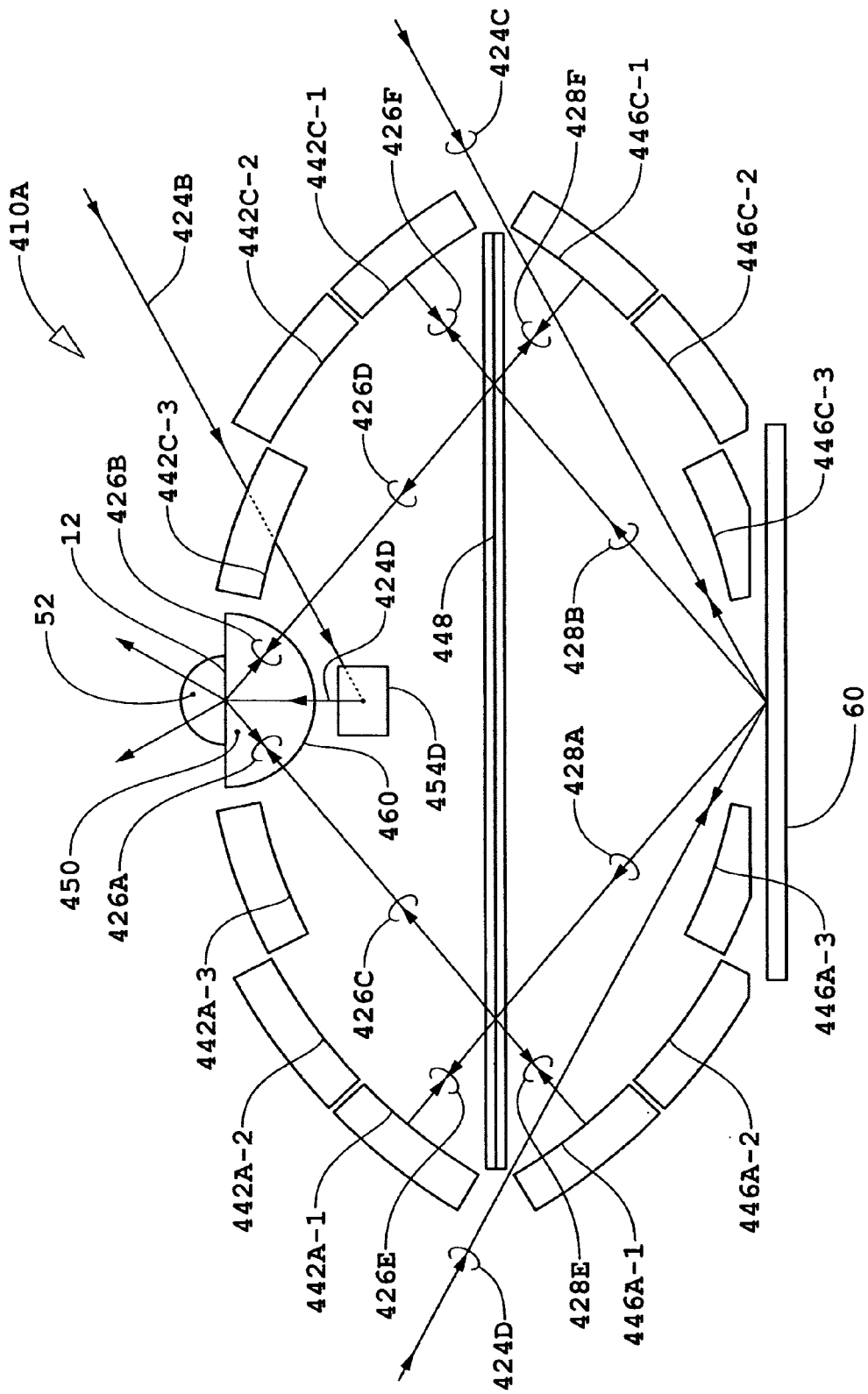
FIG. 2b is schematic diagram of a catadioptric imaging system comprising adaptive catoptric surfaces and a pellicle beam-splitter.

One data acquisition procedure based on object space coordinates is to keep standing wave reference and/or measurement beam patterns fixed relative to interferometer 10 or 100 and scan substrate 60 in the x and/or y directions. The scans in x and/or y directions can be implemented by translating the stage by transducer 82. For an example, consider detector 70 comprising a 1024×1024 pixel array CCD detector with a pitch of the pixels equal to 10 microns; secondary imaging system 120 shown in FIG. 2*a* that has a magnification of 10; magnification of catadioptric imaging system 410A shown in FIGS. 2*a* and 2*b* is equal to 1; the resolutions of the catadioptric imaging system $R_x$=100 nm and $R_y$=100 nm; the pitch of the apertures in interface 12 is equal to 1 micron; and the spatial resolutions $R_x$=50 and $R_y$=50. For the example, the electrical interference signal 72 is measured comprising components for each of the 1024×1024 pixels of detector 70 for an array of displacements of substrate 60 in the x and/or y directions of increments of 25 nm for an over sampling by a factor of two in both of the x and y directions. The number of increments in each of the x and/or y directions is accordingly 40, i.e. equal to the ratio of 1 micron and 25 nm. The resulting arrays of measured electrical interference signals are subsequently processed to obtain arrays of measured conjugated quadratures.

Alternatively, a data acquisition procedure can be based in part on translating the respective standing wave patterns on substrate 60 by scanning the relative phases of beams generating the respective standing wave patterns, e.g. by shifting the phase of beam 1024A1 relative to the phase of beam 1024B1 in FIG. 1*h*.

Note that the phase of conjugated quadratures of the infinitesimal contributions $\delta S_1$ and $\delta S_2$ is not dependent on $\Delta z$ when $\cos\theta_1 = \cos\theta_2$. Thus the phase of the conjugated quadratures of the infinitesimal contributions $\delta S_1$ and $\delta S_2$ relates directly to information about the reflecting/scattering properties of the infinitesimal volumes without complications introduced by vertical shifts of substrate 60.

The description of the electric fields of the measurement and reference beams given with respect to FIG. 1*g* is the same as corresponding portions of the description given of the electric fields of the measurement and reference beams given with respect to FIG. 1*h* except that the primary term in $\delta S_1$ and $\delta S_2$ arise from electric field components in the x direction.

The description of the electric fields of the measurement and reference beams given with respect to FIG. 1*i* is the same as corresponding portions of the description given of the electric fields of the measurement and reference beams given with respect to FIG. 1*g* with the roles of the measurement and reference beams exchanged and except that the primary term in $\delta S_1$ and $\delta S_2$ arise from electric field components in the y direction.

The description of the electric fields of the measurement and reference beams given with respect to FIG. 1*j* is the same as corresponding portions of the description given of the electric fields of the measurement and reference beams given with respect to FIG. 1*h* except that the primary term in $\delta S_1$ and $\delta S_2$ arise from electric field components in the x direction.

The description of the electric fields of the measurement and reference beams given with respect to FIG. 1*k* is the same as corresponding portions of the description given of the electric fields of the measurement and reference beams given with respect to FIG. 1*i* except that the primary term in $\delta S_1$ and $\delta S_2$ arise from electric field components in the y direction.

The properties of reflection/scattering coefficient R(x, y) for the infinitesimal volume elements for a z component of an electric field corresponds to the measurement of $\delta S_1$ or $\delta S_2$ as expressed by Equations (6) and (9). The combination of s standing wave and p standing wave beams can be used to measurement the properties of the reflection/scattering R (x, y) for x and y components of an electric field.

Height Profiling

When the reference object is not the same object as the measurement object, the phase of the corresponding conjugated quadratures is $[\phi_{1,2}+\phi+k \ (\cos \ \theta_1+\cos \ \theta_{x,0})\Delta z]$ and the lateral resolution $R_x$ in the x direction is the same as expressed by Equation (11). The background discrimination in the y direction can also be enhanced when the reference beam at beam combining interface 12 is a standing wave beam with angles of incidence in the y-z plane. Thus the phase of the conjugated quadratures of the infinitesimal contributions $\delta S_1$ and $\delta S_2$ relates directly to the height profile of substrate 60 and accordingly can be used in profiling the surface of a substrate with respect to height.

Non-Interferometric Imaging

Enhanced spatial resolutions are also obtained in non-interferometric imaging. The infinitesimal contributions $\delta I_1$ and $\delta I_2$ to the corresponding intensity signal 72 are $$\delta I_1(x, x') = 4CR(x, y)\delta V [E_{s,0}^{(1)}]^2 \times \sin(k\sin\theta_1 x)\text{sinc}^2[k\sin\theta_{x,0}(x - x')], \quad (13)$$

$$\delta I_2(x, x') = 4CR(x, y)\delta V (E_{p,0}^{(1)})^2 \times \begin{Bmatrix} \cos[k\sin\theta_1(x + \Delta x)] \\ \text{sinc}[k\sin\theta_{x,0}(x - x' + \Delta x)] + \\ \cos[k\sin\theta_1(x - \Delta x)] \\ \text{sinc}[k\sin\theta_{x,0}(x - x' - \Delta x)] \end{Bmatrix}^2. \quad (14)$$

The dependence of $\delta I_2$ on x is determined by the factor $[f(x,x',\Delta x)]^2$ where $f(x,x',\Delta x)$ is given by Equation (10). Function $[f(x,x',\Delta x)]^2$ is shown in FIG. 1*m* as a function of x for different values of $\Delta x$, i.e. $(\Delta x \sin \theta_1/\lambda)=0,\theta/4,\pi/2$, for the case of $\sin \theta_1=\sin \theta_{x,0}$.

Figure 1M:
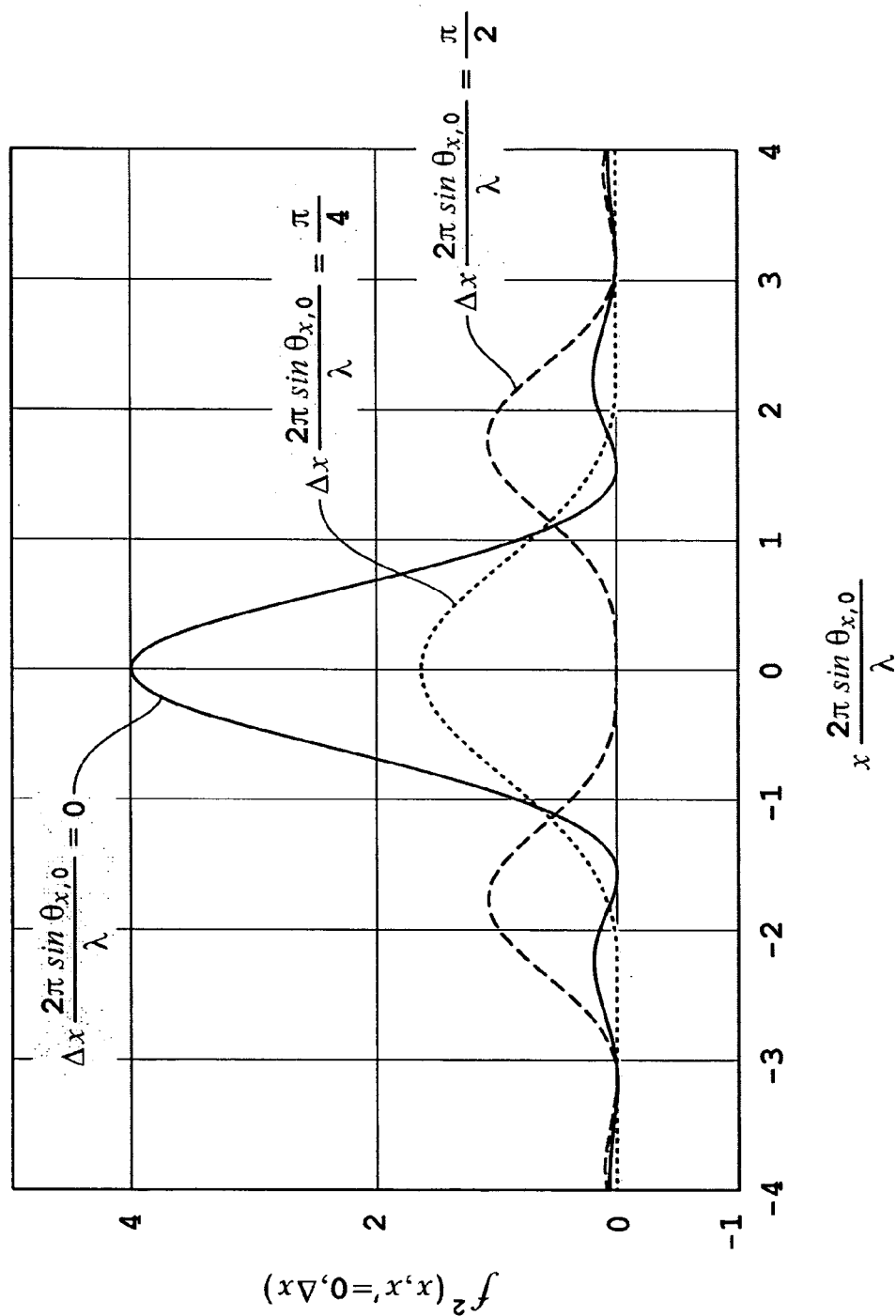
FIG. 1m is a graph of properties of a signal from a non-interferometric system that is generated using standing wave illumination of a substrate being imaged.

It is evident on examination of FIG. 1*m* that lateral resolution $R_x$ is substantially the same enhanced resolution as expressed by the Equation (11).

Depth Discrimination

It is evident on inspection of Equations (2) and (5) for the z<0 solutions that the spatial properties of $E_p^{(1)}$ and $E_S^{(1)}$ for z<0 are the same as those of standing evanescent fields propagating in the same region, i.e. exponentially decaying solutions. It is important to note that the respective spatial properties are generated advantageously with a relatively large working distance, e.g., of the order of mm's, as compared to the disadvantage of having a working distance of ~$\lambda$/4 generally required in the generation and coupling of the evanescent fields into a refractive medium (see cited book by Jackson). This is a particularly important advantage when profiling a surface of a substrate with a large spot, e.g. ~mm$^2$, simultaneously, where the surface under examination is not flat to $\leq \lambda/8$. Also, the magnitude of the damping term in the refractive medium may be selected in part by the selection of the wavelength $\lambda$ of the measurement beam.

The amplitude of background beams from out-of-focus reflective image planes internal to substrate 60 will as a consequence of the exponential attenuation of beams propagating in an absorbing medium generally be lower as compared to amplitudes of background beams generated in confocal microscopy systems for a non-absorbing medium.

The amplitudes of a standing wave reference beam and/or a standing wave measurement beam at the spots may by increased by the incorporation of a build up cavity or resonant cavity at substrate 60 and/or the beam combining element such as described in commonly owned U.S. Provisional Patent Application No. 60/221,091 (ZI-18) entitled "Multiple-Source Arrays with Optical Transmission Enhanced by Resonant Cavities" and U.S. patent application Ser. No. 09/917,400 (ZI-18) entitled "Multiple-Source Arrays with Optical Transmission Enhanced by Resonant Cavities" for which both are by Henry A. Hill and the contents of which are herein incorporated in their entirety by reference. An example of a resonant cavity is shown in FIG. 8*a* of the cited U.S. Provisional Patent Application No. 60/221,091 and U.S. patent application Ser. No. 09/917,400.

An example of an interferometer 10 is shown diagrammatically in FIG. 2*a* which comprises a catadioptric imaging system 410A shown schematically in FIG. 2*b* with catoptric elements comprising adaptive reflective surfaces and with a pellicle beam-splitter. Except with respect to the description of the respective measurement beams, the description of interferometer 10 and catadioptric imaging system 410A of FIGS. 2*a* and 2*b* is the same as corresponding portions of the description given for interferometer 10 and catadioptric imaging system 410A in FIGS. 4*a* and 4*b* of cited U.S. Provisional Patent Application No. 60/506,715 (ZI-56) and U.S. patent application Ser. No. 60/506,715 filed Sep. 24, 2004 entitled "Catoptric and Catadioptric Imaging Systems Comprising Pellicle Beam-Splitters And Non-Adaptive And Adaptive Catoptric Surfaces."

In the cited description, a non-standing wave measurement beam is incident on substrate 60 whereas in the present invention, a standing wave measurement beam is incident on substrate 60. Referring to FIG. 2*a* of the present invention, first and second portions of input beam 24 are reflected and transmitted, respectively, by beam-splitter mirror system 454A as a measurement beam and as reference beam 424B. When input beam 24 comprises non-coextensive reference and measurement beams, element 454A functions as a set of mirrors to reflect the measurement beam component of beam 24 and to transmit the reference beam component beam as reference beam 424B. Propagation of reference beam 424B is displaced out of the plane of FIG. 2*a* and directed toward mirror system 454D. Reference beam 424B exits mirror system 454D as reference beam 424D (see FIG. 2*b*). Propagation of reference beam 424D is in the plane of FIG. 2*b* and is incident on interface 12 comprising an array of apertures and thin fluorescent spots. The measurement beam is incident on non-polarizing beam-splitter 454C after reflection by mirror 454B. First and second portions of the measurement beam incident on non-polarizing beam-splitter 454C are reflected and transmitted, respectively, to form measurement beams 424C and 424D, respectively, after translations by optical elements 454D and 454E, respectively, and reflections by mirrors 454F and 454G, respectively. Optical elements 454F and 454G each comprise a pair of mirrors arranged to introduce a parallel translation of a beam. Measurement beams 424C and 424D in FIGS. 2a and 2b herein are incident on substrate 60 at a spot to form a standing wave measurement beam at the spot.

What is claimed is:

1. A method of measuring properties of a substrate, said method comprising:
    illuminating a spot on the substrate with a standing wave measurement beam to generate a return measurement beam, said standing wave measurement beam characterized by a standing wave pattern;
    generating an electrical signal from the return measurement beam;
    causing the standing wave pattern to be at a succession of different positions on the surface of the substrate; and
    for each of the succession of different positions of the standing wave pattern, acquiring measurement data from the electrical signal.

2. The method of claim 1, wherein the measurement beam is characterized by a wavelength, $\lambda$, and wherein each position of among the succession of different locations after a first location is separated from the preceding position by a distance of less than one wavelength, $\lambda$.

3. The method of claim 1, further comprising:
    illuminating an object with a standing wave reference beam to generate a return reference beam; and
    interfering the return measurement beam and the return reference beam to generate an interference beam,
    wherein generating the electrical signal involves generating the electrical signal from the interference beam.

4. The method of claim 3, wherein illuminating the object with a standing wave reference beam comprises interfering two reference beams at the object to generate the standing wave reference beam.

5. The method of claim 4, wherein illuminating the spot with a standing wave measurement beam comprises interfering two measurement beams at the spot on the substrate to produce the standing wave measurement beam.

6. The method of claim 3, wherein the object is the substrate.

7. The method of claim 1, wherein the substrate has a front side and a back side and wherein illuminating the spot on the substrate with the standing wave measurement beam involves directing a first measurement beam and a second measurement beam at the spot from the backside of the substrate to produce the standing wave measurement beam, said first and second measurement beams traveling in opposite directions relative to the surface of the substrate and wherein the return measurement beams emanates from the front side of the substrate.

8. The method of claim 5, wherein the two measurements beams lie in a first plane and the two reference beams lie in a second plane, and the method further comprises orienting the first and second planes to be orthogonal to each other.

9. The method of claim 5, further comprising:
    generating an input beam; and
    deriving the first and second measurement beams and the first and second reference beams from the input beam.

10. The method of claim 1, wherein acquiring measurement data from the electrical signal involves measuring components of conjugated quadratures of fields of scattered/reflected beams by the substrate.

11. The method of claim 1, wherein causing the standing wave pattern to be at the succession of different positions on the surface of the substrate involves moving the substrate.

12. The method of claim 1, wherein causing the standing wave pattern to be at the succession of different positions on the surface of the substrate involves scanning the standing wave pattern over the substrate.

13. The method of claim 1, wherein generating the electrical signal from the interference beam involves directing the interference beam onto a detector.

14. The method of claim 1, wherein generating the electrical signal from the interference beam involves directing the interference beam onto a fluorescent material to generate an optical signal and directing the optical signal onto a detector to generate the electrical signal.

15. A method of interferometrically measuring properties of an object, said method comprising:
    illuminating a spot on the object with a standing wave measurement beam to generate a return measurement beam;
    interfering the return measurement beam with a reference beam to generate an interference beam;
    generating an electrical interference signal from the interference beam; and
    acquiring measurement data from the electrical interference signal.

16. The method of claim 15, wherein said standing wave measurement beam characterized by a standing wave pattern and the method further comprises causing the standing wave pattern to be at a succession of different positions on the surface of the substrate, and acquiring measurement data involves for each of the succession of different positions of the standing wave pattern, acquiring measurement data from the electrical interference signal.

17. The method of claim 16, wherein the measurement beam is characterized by a wavelength, $\lambda$, and wherein each position of among the succession of different locations after a first location is separated from the preceding position by a distance of less than one wavelength, $\lambda$.

18. The method of claim 15, further comprising:
    illuminating an object with a standing wave reference beam to generate a return reference beam; and
    interfering the return measurement beam and the return reference beam to generate the interference beam.

19. The method of claim 18, wherein illuminating the object with a standing wave reference beam comprises interfering two reference beams at the object to generate the standing wave reference beam.

20. The method of claim 19, wherein illuminating the spot with a standing wave measurement beam comprises interfering two measurement beams at the spot on substrate to produce the standing wave measurement beam.

21. The method of claim 18, wherein the object is the substrate.

22. The method of claim 15, wherein the substrate has a front side and a back side and wherein illuminating the spot on the substrate with the standing wave measurement beam involves directing a first measurement beam and a second measurement beam at the spot from the backside of the substrate to produce the standing wave measurement beam, said first and second measurement beams traveling in opposite directions relative to the surface of the substrate and wherein the return measurement beams emanates from the front side of the substrate.

23. The method of claim 20, wherein the two measurements beams lie in a first plane and the two reference beams lie in a second plane, and the method further comprises orienting the first and second planes to be orthogonal to each other.

24. The method of claim 20, further comprising:
generating an input beam; and
deriving the first and second measurement beams and the first and second reference beams from the input beam.

25. The method of claim 16, wherein causing the standing wave pattern to be at the succession of different positions on the surface of the substrate involves moving the substrate.

26. The method of claim 16, wherein causing the standing wave pattern to be at the succession of different positions on the surface of the substrate involves scanning the standing wave pattern over the substrate.

27. The method of claim 15, wherein generating the electrical interference signal from the interference beam involves directing the interference beam onto a detector.

28. The method of claim 15, wherein generating the electrical signal from the interference beam involves directing the interference beam onto a fluorescent material to generate a optical signal and directing the optical signal onto a detector to generate the electrical interference signal.

29. An interferometric system for measuring properties of a substrate, the system comprising:
an optical system for illuminating a spot on the substrate with a standing wave measurement beam to thereby produce a return measurement beam from that spot;
an interferometer for interfering the return measurement beam with a reference beam to generate an interference beam; and
a detector system for converting the interference beam to an electrical interference signal.

30. The interferometric system of claim 29, wherein the optical system comprises a beam splitter for separating a first input beam into a first measurement beam and a second measurement beam and further optics for directing the first measurement beam onto the spot from one direction and the second measurement beam onto the spot from an opposite direction so as to produce the standing wave measurement beam.

31. The interferometric system of claim 30, wherein the substrate has a front side and a back side and wherein the further optics of the optical system is arranged to operate in a reflection mode by directing the first measurement beam and a second measurement beam at the spot from the front side of the substrate to produce the standing wave measurement beam and the return measurement beam emanates away from the front side of the substrate.

32. The interferometric system of claim 30, wherein the substrate has a front side and a back side and wherein the further optics of the optical system is arranged to operate in a transmission mode by directing the first measurement beam and a second measurement beam at the spot from the backside of the substrate to produce the standing wave measurement beam and the return measurement beam emanates away from the front side of the substrate.

33. The interferometric system of claim 29, wherein the interferometer includes a second optical system for illuminating an object with a standing wave reference beam to produce the return reference beam.

34. The interferometric system of claim 33, wherein the object is the substrate.

35. The interferometric system of claim 33, wherein the second optical system comprises a beam splitter for separating a second input beam into a first reference beam and a second reference beam and further optics for directing the first reference beam onto the spot from one direction and the second reference beam onto the spot from an opposite direction so as to produce the standing wave reference beam.

36. The interferometric system of claim 35, further comprising a beam source for generating a source beam, wherein the first and second input beams are derived from the source beam.

37. The interferometric system of claim 36, wherein the beam source includes a beam splitter for splitting the source beam into the first and second input beams.

38. The interferometric system of claim 29, further comprising a transport mechanism for holding the object and scanning the object relative to the interferometer.

39. The interferometric system of claim 29, wherein the interferometer comprises a catadioptric imaging system.

40. The interferometric system of claim 29, wherein the detector system comprises a detector and an imaging system which focuses the interference beam onto the detector.

41. The interferometric system of claim 29, wherein the detector system comprises a fluorescent material onto which the interference beam impinges to produce an optical signal, a detector, and an imaging system which directs the optical signal onto the detector.

42. The interferometric system of claim 41, wherein the optical signal is at a different wavelength from the interference signal.

* * * * *